(12) United States Patent
Nomaru et al.

(10) Patent No.: US 7,471,384 B2
(45) Date of Patent: Dec. 30, 2008

(54) VIA HOLE DEPTH DETECTOR

(75) Inventors: Keiji Nomaru, Tokyo (JP); Hiroshi Morikazu, Tokyo (JP); Yasuomi Kaneuchi, Tokyo (JP); Kouichi Nehashi, Tokyo (JP); Yutaka Kobayashi, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 11/896,336

(22) Filed: Aug. 31, 2007

(65) Prior Publication Data

US 2008/0055588 A1      Mar. 6, 2008

(30) Foreign Application Priority Data

Sep. 1, 2006    (JP) .............................. 2006-237747

(51) Int. Cl.
*G01N 21/00*    (2006.01)

(52) U.S. Cl. .................................... 356/241.1; 356/626

(58) Field of Classification Search ............. 356/241.1, 356/625, 626; 250/559.19
See application file for complete search history.

(56) References Cited

U.S. PATENT DOCUMENTS 5,317,387 A * 5/1994 Van Hengel et al. ........ 356/625

FOREIGN PATENT DOCUMENTS

| JP | 2003-163323 | 6/2003 |
| JP | 2006-255761 | 9/2006 |

* cited by examiner

*Primary Examiner*—Roy M Punnoose
(74) *Attorney, Agent, or Firm*—Smith, Gambrell & Russell, LLP

(57) ABSTRACT

A via hole depth detector for detecting the depth of a via hole formed in a workpiece held on a chuck table, comprising: a first surface position detection means which comprises a first detection laser beam oscillation means for oscillating a first detection laser beam having a predetermined wavelength and detects the height position of an illuminated portion of the workpiece based on the reflected light of the first detection laser beam; a second surface position detection means which comprises a second detection laser beam oscillation means for oscillating a second detection laser beam having a wavelength different from the wavelength of the first detection laser beam and detects the height position of an illuminated portion of the workpiece based on the reflected light of the second detection laser beam; and a control means for obtaining the depth of the via hole formed in the workpiece based on a detection value obtained by the first surface position detection means and a detection value obtained by the second surface position detection means.

8 Claims, 9 Drawing Sheets

| PROCESSING POSITION | | UNPROCESSED THICKNESS (μm) | VALUE CORRESPONDING TO REFLECTANCE OF ELECTRODE | DECISION | NUMBER OF RE-PROCESSING PULSES |
|---|---|---|---|---|---|
| E1 | 303a | 0 | ○ | ○ | – |
| E1 | 303b | 0 | ○ | ○ | – |
| E1 | 303c | 5 | ○ | ○ | – |
| E1 | 303d | 0 | ○ | ○ | – |
| E1 | 303e | 0 | ○ | ○ | – |
| E1 | 303f | 10 | × | × | 5 |
| E1 | 303g | 0 | ○ | ○ | – |
| E1 | 303h | 0 | ○ | ○ | – |
| E1 | 303i | 0 | ○ | ○ | – |
| ⋮ | ⋮ | ⋮ | ⋮ | ⋮ | ⋮ |
| En | 303a | 0 | ○ | ○ | – |
| En | 303b | 20 | × | × | 10 |
| En | 303c | 0 | ○ | ○ | – |
| ⋮ | ⋮ | ⋮ | ⋮ | ⋮ | ⋮ |

VIA HOLE DEPTH DETECTOR

FIELD OF THE INVENTION

The present invention relates to a detector for detecting the depth of a via hole formed in a workpiece.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer, and a device such as IC or LSI is formed in each of the sectioned areas. Individual semiconductor chips are manufactured by cutting this semiconductor wafer along the streets to divide it into the areas each having a device formed therein.

To reduce the size and increase the number of functions of an apparatus, a modular structure for connecting the electrodes of a plurality of semiconductor chips which are formed in a layer has been implemented and disclosed by JP-A 2003-163323. This modular structure is such that via holes reaching the electrodes are formed from the rear side at positions where the electrodes are formed on the front surface of a semiconductor wafer, and a conductive material such as aluminum to be connected to the electrodes is embedded in the via holes.

The via holes formed in the above semiconductor wafer are generally formed by a drill. However, the diameters of the via holes formed in the semiconductor wafer are as small as 100 to 300 μm and hence, there is a problem in that drilling the via holes is not always satisfactory in terms of productivity.

To solve the above problem, the company of the applicant of the present application proposed as JP-A 2006-255761 a laser beam processing machine capable of efficiently forming via holes in a workpiece such as a semiconductor wafer. This laser beam processing machine is a processing-feed amount detection means for detecting the relative processing-feed amount of a chuck table for holding a workpiece and a laser beam application means, a memory means for storing the X and Y coordinate values of via holes to be formed in the workpiece and a control means for controlling the laser beam application means based on the X and Y coordinate values of via holes stored in the memory means and a detection signal from the processing-feed amount detection means, and is so constituted as to apply a laser beam when the point of the X and Y coordinate values of a via hole to be formed in the workpiece reaches a position right below the condenser of the laser beam application means.

In the above method of forming via holes by applying a laser beam from the rear surface of the semiconductor wafer described above, the application of the laser beam must be stopped not to make a hole in the electrodes formed on the front surface of the semiconductor wafer. To this end, the application of the laser beam must be stopped at the time when the via hole has reached the electrode. It is, however, extremely difficult to detect that the via hole has reached the electrode, and there is a case where the via hole does not have reached the electrode. Accordingly, it is necessary to check if the via hole formed in the wafer has reached the electrode or not. If the via hole does not have reached the electrode, it is desired that the depth of the via hole can be detected so that the semiconductor wafer can be re-processed efficiently.

SUMMARY OF THE INVENTION

It is an object of the present invention to provide a detector capable of efficiently detecting the depth of a via hole formed in a workpiece.

To attain the above object, according to the present invention, there is provided a via hole depth detector for detecting the depth of a via hole formed in a workpiece held on the holding surface of a chuck table, comprising:

a first surface position detection means which has a first detection laser beam oscillation means for oscillating a first detection laser beam having a predetermined wavelength to a first optical path and detects the height position of an illuminated portion of the workpiece based on the reflected light of the first detection laser beam;

a second surface position detection means which has a second detection laser beam oscillation means for oscillating a second detection laser beam having a wavelength different from the wavelength of the first detection laser beam to a second optical path and detects the height position of an illuminated portion of the workpiece based on the reflected light of the second detection laser beam;

a synthetic beam splitter for guiding the first detection laser beam oscillated to the first optical path and the second detection laser beam oscillated to the second optical path to a third optical path;

a condenser which is installed in the third optical path and converges the first detection laser beam and the second detection laser beam to apply them to the workpiece held on the chuck table;

a focal point positioning means which is installed in the first or second optical path and changes the position of the focal point of the first detection laser beam or the second detection laser beam; and a control means for obtaining the depth of a via hole formed in the workpiece based on a detection value obtained by the first surface position detection means and a detection value obtained by the second surface position detection means.

The above first surface position detection means comprises a first non-deflection beam splitter which is installed in the first optical path and guides light reflected from the workpiece to a fourth optical path, a pass filter which is installed in the fourth optical path and transmits only reflected light having a wavelength corresponding to that of the first detection laser beam out of the reflected light split by the first non-deflection beam splitter, a non-deflection auxiliary beam splitter for splitting the reflected light passing through the pass filter into a fifth optical path and a sixth optical path, a first light receiving device which receives 100% of the reflected light split into the fifth optical path by the non-deflection auxiliary beam splitter, a second light receiving device which receives the reflected light split into the sixth optical path by the non-deflection auxiliary beam splitter, and a light receiving area restricting means which is installed in the sixth optical path and restricts the light receiving area of the reflected light to be received by the second light receiving device;

the above second surface position detection means comprises a second non-deflection beam splitter which is installed in the second optical path and guides light reflected from the workpiece to a seventh optical path, a pass filter which is installed in the seventh optical path and transmits only reflected light having a wavelength corresponding to that of the second detection laser beam out of the reflected light split by the second non-deflection beam splitter, a non-deflection auxiliary beam splitter for splitting the reflected light passing through the pass filter into an eighth optical path and a ninth optical path, a first light receiving device which receives 100% of the reflected light split into the eighth optical path by the non-deflection auxiliary beam splitter, a second light receiving device which receives the reflected light split into the ninth optical path by the non-deflection auxiliary beam splitter, and a light receiving area restricting means which is installed in the ninth optical path and restricts the light receiving area of the reflected light to be received by the second light receiving device; and the above control means calculates the ratio of the quantity of light received by the first light receiving device to the quantity of light received by the second light receiving device of the first surface position detection means based on detection signals from the first light receiving device and the second light receiving device to obtain the height position of the top surface of the workpiece or the height position of the bottom surface of a via hole based on the ratio, calculates the ratio of the quantity of light received by the first light receiving device to the quantity of light received by the second light receiving device of the second surface position detection means based on detection signals from the first light receiving device and the second light receiving device to obtain the height position of the bottom surface of the via hole or the height position of the top surface of the workpiece based on the ratio, and obtains the depth of the via hole formed in the workpiece based on the height position of the top surface of the workpiece and the height position of the bottom surface of the via hole.

The above control means comprises a memory having a storage area for storing a control map showing the relationship between the ratio of the quantity of light received by the first light receiving device to the quantity of light received by the second light receiving device of the first surface position detection means or the second surface position detection means and the height position of a portion illuminated by the first detection laser beam or the second detection laser beam, calculates the ratio of the quantity of light received by the first light receiving device to the quantity of light received by the second light receiving device of the first surface position detection means based on detection signals from the first light receiving device and the second light receiving device to obtain the height position of the top surface of the workpiece or the height position of the bottom surface of the via hole by collating the ratio with the control map, calculates the ratio of the quantity of light received by the first light receiving device to the quantity of light received by the second light receiving device of the second surface position detection means based on detection signals from the first light receiving device and the second light receiving device to obtain the height position of the bottom surface of the via hole or the height position of the top surface of the workpiece by collating the ratio with the control map, and obtains the depth of the via hole formed in the workpiece based on the height position of the top surface of the workpiece and the height position of the bottom surface of the via hole.

The memory of the above control means has a storage area for storing data on the reflectances of a plurality of substances, and the above control means judges whether the via hole formed in the workpiece reaches some other substance from the processed substance based on the amount of light received by the first light receiving device of the first surface position detection means or the second surface position detection means.

Further, according to the present invention, there is provided a via hole depth detector for detecting the depth of a via hole formed in a workpiece held on the holding surface of a chuck table, comprising:

a detection laser beam oscillation means for oscillating a detection laser beam;

a deflection beam splitter for splitting the detection laser beam oscillated by the detection laser beam oscillator into a P wave and an S wave and guiding them to a first optical path and a second optical path, respectively;

a synthetic beam splitter for guiding the P wave and S wave of the detection laser beam split by the deflection beam splitter to a third optical path;

a condenser which is installed in the third optical path and converges the P wave and S wave of the detection laser beam to apply them to the workpiece held on the chuck table;

a focal point positioning means which is installed in the first or second optical path and changes the focal point position of the P wave or S wave of the detection laser beam;

a first surface position detection means for detecting the height position of an illuminated portion of the workpiece based on the reflected light of the P wave or S wave of the detection laser beam applied to the workpiece from the condenser;

a second surface position detection means for detecting the height position of an illuminated portion of the workpiece based on the reflected light of the S wave or P wave of the detection laser beam applied to the workpiece from the condenser; and a control means for obtaining the depth of a via hole formed in the workpiece based on a detection value obtained by the first surface position detection means and a detection value obtained by the second surface position detection means.

The above first surface position detection means comprises a first non-deflection beam splitter which is installed in the first optical path and guides light reflected from the workpiece to a fourth optical path, a pass filter which is installed in the fourth optical path and transmits only the P wave or S wave of the detection laser beam out of the reflected light guided by the first non-deflection beam splitter, a non-deflection auxiliary beam splitter for splitting the reflected light passing through the pass filter into a fifth optical path and a sixth optical path, a first light receiving device which receives 100% of the reflected light split into the fifth optical path by the non-deflection auxiliary beam splitter, a second light receiving device which receives the reflected light split into the sixth optical path by the non-deflection auxiliary beam splitter, and a light receiving area restricting means which is installed in the sixth optical path and restricts the light receiving area of the reflected light to be received by the second light receiving device;

the above second surface position detection means comprises a second non-deflection beam splitter which is installed in the second optical path and guides light reflected from the workpiece to a seventh optical path, a pass filter which is installed in the seventh optical path and transmits only the S wave or P wave of the detection laser beam out of the reflected light guided by the second non-deflection beam splitter, a non-deflection auxiliary beam splitter for splitting the reflected light passing through the pass filter into an eighth optical path and a ninth optical path, a first light receiving device which receives 100% of the reflected light split into the eighth optical path by the non-deflection auxiliary beam splitter, a second light receiving device which receives the reflected light split into the ninth optical path by the non-deflection auxiliary beam splitter, and a light receiving area restricting means which is installed in the ninth optical path and restricts the light receiving area of the reflected light to be received by the second light receiving device; and the above control means calculates the ratio of the quantity of light received by the first light receiving device to the quantity of light received by the second light receiving device of the first surface position detection means based on detection signals from the first light receiving device and the second light receiving device to obtain the height position of the top surface of the workpiece or the height position of the bottom surface of a via hole based on the ratio, calculates the ratio of the quantity of light received by the first light receiving device to the quantity of light received by the second light receiving device of the second surface position detection means based on detection signals from the first light receiving device and the second light receiving device to obtain the height position of the bottom surface of the via hole or the height position of the top surface of the workpiece based on the ratio, and obtains the depth of the via hole formed in the workpiece based on the height position of the top surface of the workpiece and the height position of the bottom surface of the via hole.

The above control means comprises a memory having a storage area for storing a control map indicating the relationship between the ratio of the quantity of light received by the first light receiving device to the quantity of light received by the second light receiving device of the first surface position detection means or the second surface position detection means and the height position of a portion illuminated by the P wave or S wave of the detection laser beam, calculates the ratio of the quantity of light received by the first light receiving device to the quantity of light received by the second light receiving device of the first surface position detection means based on detection signals from the first light receiving device and the second light receiving device to obtain the height position of the top surface of the workpiece or the height position of the bottom surface of the via hole by collating the ratio with the control map, calculates the ratio of the quantity of light received by the first light receiving device to the quantity of light received by the second light receiving device of the second surface position detection means based on detection signals from the first light receiving device and the second light receiving device to obtain the height position of the bottom surface of the via hole or the height position of the top surface of the workpiece by collating the ratio with the control map, and obtains the depth of the via hole formed in the workpiece based on the height position of the top surface of the workpiece and the height position of the bottom surface of the via hole.

The memory of the above control means has a storage area for storing data on the reflectances of a plurality of substances, and the control means judges whether the via hole formed in the workpiece reaches another substance from the processed substance based on the quantity of light received by the first light receiving device of the first surface position detection means or the second surface position detection means.

Since the via hole depth detector of the present invention obtains the depth of a via hole formed in the workpiece based on a detection value obtained by the first surface position detection means which comprises the first detection laser beam oscillation means and detects the height position of an illuminated portion of the workpiece based on the reflected light of the first detection laser beam and a detection value obtained by the second surface position detection means which comprises the second detection laser beam oscillation means and detects the height position of an illuminated portion of the workpiece based on the reflected light of the second detection laser beam. Therefore, the depth of the via hole formed in the workpiece can be detected efficiently. Consequently, an incomplete via hole can be re-processed without fail.

BRIEF DESCRIPTION OF THE DRAWINGS

FIG. 13 is a diagram showing an example of a decision map prepared by the control means provided in the laser beam processing machine shown in FIG. 1.

DETAILED DESCRIPTION OF THE PREFERRED EMBODIMENTS

Preferred embodiments of the present invention will be described in detail hereinbelow with reference to the accompanying drawings.

Figure 1:
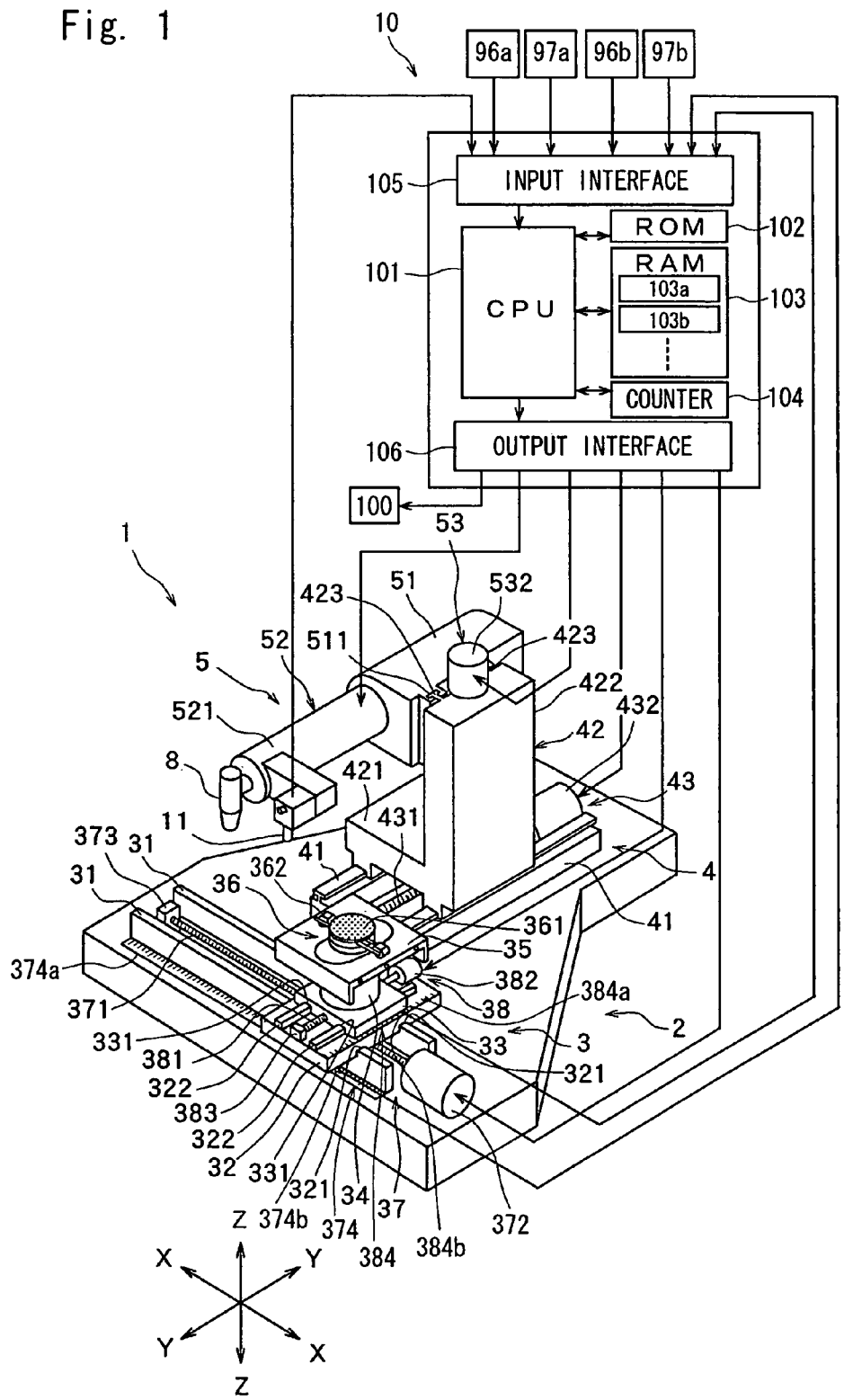
FIG. 1 is a perspective view of a laser beam processing machine comprising a via hole depth detector constituted according to the present invention.

FIG. 1 is a perspective view of a laser beam processing machine comprising a via hole depth detector constituted according to the present invention. The laser beam processing machine 1 shown in FIG. 1 comprises a stationary base 2, a chuck table mechanism 3 for holding a workpiece, which is mounted on the stationary base 2 in such a manner that it can move in a processing-feed direction (X direction) indicated by an arrow X, a laser beam application unit support mechanism 4 mounted on the stationary base 2 in such a manner that it can move in an indexing-feed direction (Y direction) indicated by an arrow Y perpendicular to the direction indicated by the arrow X, and a laser beam application unit 5 mounted to the laser beam application unit support mechanism 4 in such a manner that it can move in a direction (Z direction) indicated by an arrow Z.

The above chuck table mechanism 3 comprises a pair of guide rails 31 and 31 mounted on the stationary base 2 and arranged parallel to each other in the processing-feed direction indicated by the arrow X, a first sliding block 32 mounted on the guide rails 31 and 31 in such a manner that it can move in the processing-feed direction indicated by the arrow X, a second sliding block 33 mounted on the first sliding block 32 in such a manner that it can move in the indexing-feed direction indicated by the arrow Y, a support table 35 supported on the second sliding block 33 by a cylindrical member 34, and a chuck table 36 as a workpiece holding means. This chuck table 36 comprises an adsorption chuck 361 made of a porous material, and a workpiece, for example, a disk-like semiconductor wafer is held on a holding surface which is the top surface of the adsorption chuck 361 by a suction means that is not shown. The chuck table 36 constituted as described above is turned by a pulse motor (not shown) installed in the cylindrical member 34. The chuck table 36 is provided with clamps 362 for fixing an annular frame which will be described later.

The above first sliding block 32 has, on its undersurface, a pair of to-be-guided grooves 321 and 321 to be fitted to the above pair of guide rails 31 and 31 and, on the top surface, a pair of guide rails 322 and 322 formed parallel to each other in the indexing-feed direction indicated by the arrow Y. The first sliding block 32 constituted as described above can move along the pair of guide rails 31 and 31 in the processing-feed direction indicated by the arrow X by fitting the to-be-guided grooves 321 and 321 to the pair of guide rails 31 and 31, respectively. The chuck table mechanism 3 in the illustrated embodiment comprises a processing-feed means 37 as an X-axis moving means for moving the first sliding block 32 along the pair of guide rails 31 and 31 in the processing-feed direction indicated by the arrow X. The processing-feed means 37 comprises a male screw rod 371 arranged between the above pair of guide rails 31 and 31 in parallel thereto, and a drive source such as a pulse motor 372 for rotary-driving the male screw rod 371. The male screw rod 371 is, at its one end, rotatably supported to a bearing block 373 fixed on the above stationary base 2 and is, at the other end, transmission-coupled to the output shaft of the above pulse motor 372. The male screw rod 371 is screwed into a threaded through-hole formed in an unshown female screw block projecting from the undersurface of the center portion of the first sliding block 32. Therefore, by driving the male screw rod 371 in a normal direction or adverse direction with the pulse motor 372, the first sliding block 32 is moved along the guide rails 31 and 31 in the processing-feed direction indicated by the arrow X.

The laser beam processing machine 1 in the illustrated embodiment comprises a processing-feed amount detection means 374 for detecting the processing-feed amount of the above chuck table 36. The processing-feed amount detection means 374 is composed of a linear scale 374a arranged along the guide rail 31 and a read head 374b which is mounted on the first sliding block 32 and moves along the linear scale 374a together with the first sliding block 32. The read head 374b of this processing-feed amount detection means 374 supplies one pulse signal for every 1 μm to a control means which will be described later in the illustrated embodiment. The control means later described counts the input pulse signals to detect the processing-feed amount of the chuck table 36. When the pulse motor 372 is used as a drive source for the above processing-feed means 37, the processing-feed amount of the chuck table 36 can be detected by counting the drive pulses of the control means later described for outputting a drive signal to the pulse motor 372. When a servo motor is used as a drive source for the above processing-feed means 37, pulse signals outputted from a rotary encoder for detecting the revolution of the servo motor are supplied into the control means later-described, and the control means counts the pulse signals input, thereby making it possible to detect the processing-feed amount of the chuck table 36.

The above second sliding block 33 has, on the undersurface, a pair of to-be-guided grooves 331 and 331 to be fitted to the pair of guide rails 322 and 322 on the top surface of the above first sliding block 32 and can move in the indexing-feed direction indicated by the arrow Y by fitting the to-be-guided grooves 331 and 331 to the pair of guide rails 322 and 322, respectively. The chuck table mechanism 3 in the illustrated embodiment comprises a first indexing-feed means 38 as a first Y-axis moving means for moving the second sliding block 33 along the pair of guide rails 322 and 322 on the first sliding block 32 in the indexing-feed direction indicated by the arrow Y. The first indexing-feed means 38 comprises a male screw rod 381 which is arranged between the above pair of guide rails 322 and 322 in parallel thereto, and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or adverse direction with the pulse motor 382, the second sliding block 33 is moved along the guide rails 322 and 322 in the indexing-feed direction indicated by the arrow Y.

The laser beam processing machine 1 in the illustrated embodiment comprises an indexing-feed amount detection means 384 for detecting the indexing-feed amount of the above second sliding block 33. This indexing-feed amount detection means 384 comprises a linear scale 384a arranged along the guide rail 322 and a read head 384b which is mounted on the second sliding block 33 and moves along the linear scale 384a together with the second sliding block 33. The read head 384b of the indexing-feed amount detection means 384 supplies one pulse signal for every 1 μm to the control means later described in the illustrated embodiment. The control means later described counts the input pulse signals to detect the indexing-feed amount of the chuck table 36. When the pulse motor 382 is used as a drive source for the above first indexing-feed means 38, the indexing-feed amount of the chuck table 36 can be detected by counting the drive pulses of the control means later described for outputting a drive signal to the pulse motor 382. When a servo motor is used as a drive source for the above first indexing-feed means 38, pulse signals outputted from a rotary encoder for detecting the revolution of the servo motor are supplied into the control means later-described, and the control means counts the pulse signals input, thereby making it possible to detect the indexing-feed amount of the chuck table 36.

The above laser beam application unit support mechanism 4 comprises a pair of guide rails 41 and 41 mounted on the stationary base 2 and arranged parallel to each other in the indexing-feed direction indicated by the arrow Y and a movable support base 42 mounted on the guide rails 41 and 41 in such a manner that it can move in the direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction indicated by the arrow Z on one of its flanks. The laser beam application unit support mechanism 4 in the illustrated embodiment comprises a second indexing-feed means 43 as a second Y-axis moving means for moving the movable support base 42 along the pair of guide rails 41 and 41 in the indexing-feed direction indicated by the arrow Y. This second indexing-feed means 43 comprises a male screw rod 431 arranged between the above pair of guide rails 41 and 41 in parallel thereto and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by driving the male screw rod 431 in a normal direction or adverse direction with the pulse motor 432, the movable support base 42 is moved along the guide rails 41 and 41 in the indexing-feed direction indicated by the arrow Y.

The laser beam application unit 5 in the illustrated embodiment comprises a unit holder 51 and a laser beam application means 52 secured to the unit holder 51. The unit holder 51 has a pair of to-be-guided grooves 511 and 511 to be slidably fitted to the pair of guide rails 423 and 423 on the above mounting portion 422 and is supported in such a manner that it can move in the direction (Z direction) indicated by the arrow Z by fitting the to-be-guided grooves 511 and 511 to the above guide rails 423 and 423, respectively.

The illustrated laser beam application means 52 has a cylindrical casing 521 extending substantially horizontally. In the casing 521, there are installed a processing pulse laser beam oscillation means 6 and a direction changing mirror 7 for changing the direction of a processing pulse laser beam oscillated from this processing pulse laser beam oscillation means 6 at 90° to a downward direction in FIG. 2. A condenser 8 comprising a condenser lens 81 for converging a laser beam whose direction has been changed by the direction changing mirror 7 is mounted on the end of the casing 521 (see FIG. 1). The processing pulse laser beam oscillation means 6 oscillates a processing pulse laser beam LB of a wavelength having absorptivity for a wafer as the workpiece. As this processing pulse laser beam oscillation means 6 may be used a YVO4 pulse laser oscillator or a YAG pulse laser oscillator which oscillates the processing pulse laser beam LB having a wavelength of, for example, 355 nm when the wafer comprises a silicon substrate, silicon carbide substrate, lithium tantalate substrate, glass substrate or quartz substrate.

The condenser 8 comprising the above condenser lens 81 is mounted onto the end of the above casing 521. This condenser 8 is constituted by a combination of lenses including the condenser lens 81, and focuses the processing pulse laser beam LB which has been oscillated from the above processing pulse laser beam oscillation means 6 and whose direction has been changed by the direction changing mirror 7, at a focal point P.

Figure 2:
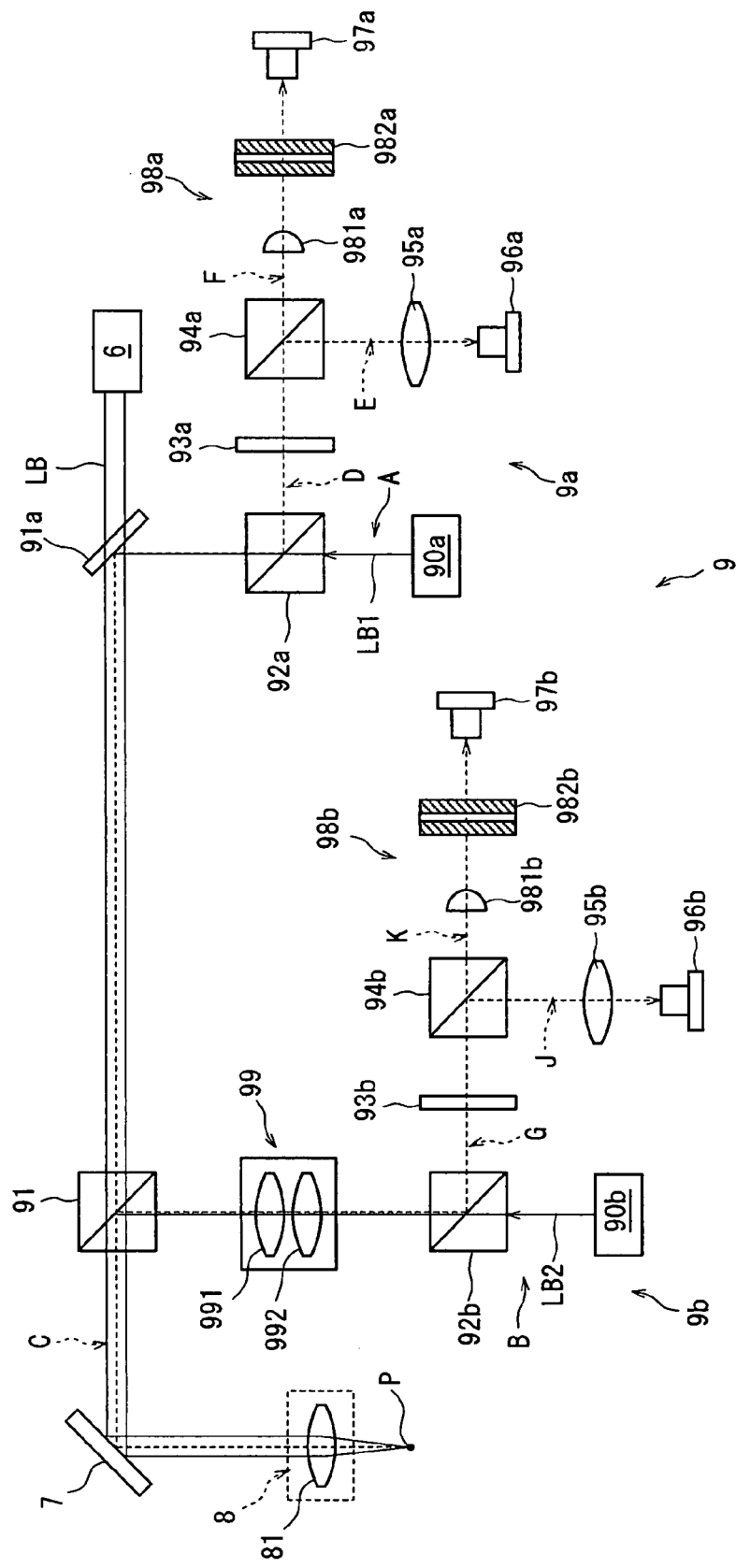
FIG. 2 is a schematic block diagram of a laser beam application means and a via hole depth detector constituted according to the present invention provided in the laser beam processing machine shown in FIG. 1.
Figure 3:
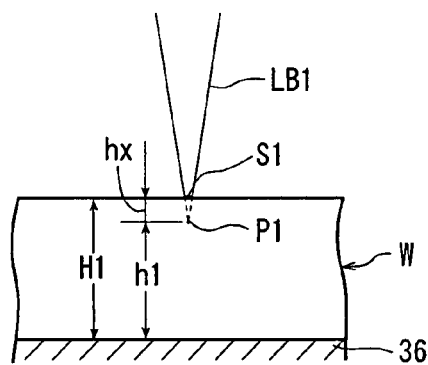
FIG. 3 is an explanatory diagram showing a state where the illuminated area changes according to the application position of a first detection laser beam LB1 illuminated from the first surface position detection means of the via hole depth detector shown in FIG. 2.

Still referring to FIG. 2, the laser beam processing machine 1 in the illustrated embodiment has a detector 9 for detecting the depth of a via hole formed in the workpiece held on the chuck table 36. In the illustrated embodiment, the via hole depth detector 9 is composed of a first surface position detection means 9a having a first detection laser beam oscillation means 90a for oscillating a first detection laser beam LB1 to a first optical path A and a second surface position detection means 9b having a second detection laser beam oscillation means 90b for oscillating a second detection laser beam LB2 to a second optical path B. Further, the via hole depth detector 9 comprises a synthetic beam splitter 91 for guiding the first detection laser beam LB1 oscillated to the first optical path A and the second detection laser beam LB2 oscillated to the second optical path B, to a third optical path C. The above condenser 8 is designed to be installed in the third optical path C.

The above first surface position detection means 9a comprises the above first detection laser beam oscillation means 90a, a dichroic half mirror 91a interposed between the above processing pulse laser beam oscillation means 6 and the synthetic beam splitter 91, and a first non-deflection beam splitter 92a interposed between the dichroic half mirror 91a and the first detection laser beam oscillation means 90a. As the first detection laser beam oscillation means 90a may be used a He—Ne laser oscillator which oscillates the first detection laser beam LB1 having a wavelength of, for example, 633 nm. The dichroic half mirror 91a transmits the processing pulse laser beam LB oscillated from the processing pulse laser beam oscillation means 6 toward the synthetic beam splitter 91 and changes the direction of the first detection laser beam LB1 oscillated from the first detection laser beam oscillation means 90a toward the synthetic beam splitter 91. The first non-deflection beam splitter 92a transmits the first detection laser beam LB1 and changes the direction of light reflected by the dichroic half mirror 91a to a fourth optical path D.

The first surface position detection means 9a in the illustrated embodiment further comprises a pass filter 93a which transmits only reflected light corresponding to the wavelength (for example, 633 nm) of the first detection laser beam LB1 out of light reflected by the first non-deflection beam splitter 92a, a non-deflection auxiliary beam splitter 94a for splitting the reflected light passing through the pass filter 93a into a fifth optical path E and a sixth optical path F, a condenser lens 95a for converging 100% of the reflected light split into the fifth optical path E by the non-deflection auxiliary beam splitter 94a, and a first light receiving device 96a for receiving the reflected light converged by the condenser lens 95a. The first light receiving device 96a supplies a voltage signal corresponding to the quantity of its received light to the control means that will be described later. The first surface position detection means 9a in the illustrated embodiment further comprises a second light receiving device 97a for receiving the reflected light split into the sixth optical path F by the non-deflection auxiliary beam splitter 94a, and a light receiving area restricting means 98a for restricting the receiving area of the reflected light to be received by the second light receiving device 97a. The light receiving area restricting means 98a in the illustrated embodiment is composed of a cylindrical lens 981a for converging the reflected light split into the sixth optical path F by the non-deflection auxiliary beam splitter 94a unidimensionally and a unidimensional mask 982a for restricting the reflected light converged unidimensionally by the cylindrical lens 981a to a unit length. The second light receiving device 97a for receiving the reflected light passing through the unidimensional mask 982a supplies a voltage signal corresponding to the quantity of its received light to the control means that will be described later.

A description will be subsequently given of the second surface position detection means 9b constituting the via hole depth detector 9.

The second surface position detection means 9b has the above second detection laser beam oscillation means 90b for oscillating the second detection laser beam LB2, and a second non-deflection beam splitter 92b interposed between the second detection laser beam oscillation means 90b and the above synthetic beam splitter 91. As the second detection laser beam oscillation means 90b may be used a YAG laser oscillator which oscillates the second detection laser beam LB2 having a wavelength of, for example, 532 nm. The second non-deflection beam splitter 92b transmits the second detection laser beam LB2 and changes the direction of light reflected by the above synthetic beam splitter 91, to a seventh optical path G.

The second surface position detection means 9b in the illustrated embodiment further comprises a pass filter 93b which transmits only reflected light corresponding to the wavelength (for example, 532 nm) of the second detection laser beam LB2 out of light reflected by the second non-deflection beam splitter 92b, a non-deflection auxiliary beam splitter 94b for splitting the reflected light passing through the pass filter 93b into an eighth optical path J and a ninth optical path K, a condenser lens 95b for converging 100% of the reflected light split into the eighth optical path J by the non-deflection auxiliary beam splitter 94b, and a first light receiving device 96b for receiving the reflected light converged by the condenser lens 95b. The first light receiving device 96b supplies a voltage signal corresponding to the quantity of its received light to the control means that is described later. The second surface position detection means 9b in the illustrated embodiment further comprises a second light receiving device 97b for receiving the reflected light split into the ninth optical path K by the non-deflection auxiliary beam splitter 94b, and a light receiving area restricting means 98b for restricting the receiving area of the reflected light to be received by the second light receiving device 97b. The light receiving area restricting means 98b in the illustrated embodiment is composed of a cylindrical lens 981b for converging the reflected light split into the ninth optical path K by the non-deflection auxiliary beam splitter 94b unidimensionally and a unidimensional mask 982b for restricting the reflected light converged unidimensionally by the cylindrical lens 981b to a unit length. The second light receiving device 97b for receiving the reflected light passing through the unidimensional mask 982b supplies a voltage signal corresponding to the quantity of its received light to the control means that is described later. The second surface position detection means 9b in the illustrated embodiment comprises a beam expander 99 as a focal point positioning means interposed between the above synthetic beam splitter 91 and the second non-deflection beam splitter 92b. This beam expander 99 is composed of two convex lenses 991 and 992 and an adjusting means (not shown) for adjusting the interval between the two convex lenses 991 and 992.

The via hole depth detector 9 in the illustrated embodiment is constituted as described above, and its function will be described hereinbelow. A description is first given of the function of the first surface position detection means 9a constituting the via hole depth detector 9.

The first detection laser beam LB1 oscillated from the first detection laser beam oscillation means 90a of the first surface position detection means 9a passes through the first non-deflection beam splitter 92a and reaches the dichroic half mirror 91a to be reflected toward the synthetic beam splitter 91. The first detection laser beam LB1 reflected toward the synthetic beam splitter 91 passes through the synthetic beam splitter 91 and the third optical path C, is deflected by the direction changing mirror 7 and converged by the condenser lens 81, like the above processing pulse laser beam LB. The first detection laser beam LB1 converged as described above is reflected on the front surface (top surface) of the workpiece held on the chuck table 36 and its reflected light reaches the pass filter 93a through the condenser lens 81, the direction changing mirror 7, the synthetic beam splitter 91, the dichroic half mirror 91a and the first non-deflection beam splitter 92a, as shown by a broken line in FIG. 2. As will be described later, the reflected light of the second detection laser beam LB2 also reaches the pass filter 93a through the same route as the first detection laser beam LB1. Since the pass filter 93a is so constituted as to transmit only reflected light corresponding to the wavelength (for example, 633 nm) of the first detection laser beam LB1 as described above, the reflected light of the second detection laser beam LB2 is cut off by the pass filter 93a. Therefore, only the reflected light of the first detection laser beam LB1 passes through the pass filter 93a and reaches the non-deflection auxiliary beam splitter 94a.

The reflected light of the first detection laser beam LB1 which has reached the non-deflection auxiliary beam splitter 94a is split into the fifth optical path E and the sixth optical path F. The reflected light split into the fifth optical path E is 100% converged by the condenser lens 95a and received by the first light receiving device 96a. The first light receiving device 96a supplies then a voltage signal corresponding to the quantity of its received light to the control means that is described later. Meanwhile, the reflected light of the first detection laser beam LB1 split into the sixth optical path F is converged unidimensionally by the cylindrical lens 981a of the light receiving area restricting means 98a, restricted to a predetermined unit length by the unidimensional mask 982a and received by the second light receiving device 97a. Then, the second light receiving device 97a supplies a voltage signal corresponding to the quantity of its received light to the control means that is described later.

A description will be subsequently given of the quantity of the reflected light of the first detection laser beam LB1 to be received by the first light receiving device 96a and the second light receiving device 97a. Since the reflected light of the first detection laser beam LB1 to be received by the first light receiving device 96a is 100% converged by the condenser lens 95a, the quantity of received light is constant and the voltage value (V1) output from the first light receiving device 96a is constant (for example, 10 V). Meanwhile, the reflected light of the first detection laser beam LB1 to be received by the second light receiving device 97a is converged unidimensionally by the cylindrical lens 981a, then restricted to the predetermined unit length by the unidimensional mask 982a and received by the second light receiving device 97a. Therefore, the quantity of light received by the second light receiving device 97a changes according to the position of the focal point P1 of the first detection laser beam LB1 focused by the condenser lens 81 of the condenser 8 in the workpiece. Accordingly, the voltage value (V2) output from the second light receiving device 97a changes according to the position of the focal point P1 of the first detection laser beam LB1 in the workpiece.

For instance, when the first detection laser beam LB1 is applied to the workpiece W held on the chuck table 36 by setting its focal point P1 to a position at a height h1 above the surface (top surface) of the chuck table 36, the first detection laser beam LB1 is reflected at an area S1 on the front surface (top surface) of the workpiece W. This reflected light is split into the fifth optical path E and the sixth optical path F by the non-deflection auxiliary beam splitter 94a as described above. Since the reflected light of the area S1 split into the fifth optical path E is 100% converged by the condenser lens

95a, all the quantity of the reflected light is received by the first light receiving device 96a. Meanwhile, since the reflected light of the area S1 split into the sixth optical path F by the non-deflection auxiliary beam splitter 94a is converged unidimensionally by the cylindrical lens 981a, its section becomes elliptic. Therefore, as the reflected light having an elliptic section is restricted to the predetermined unit length by the unidimensional mask 982a, part of the reflected light split into the sixth optical path F is received by the second light receiving device 97a. Consequently, the quantity of light received by the second light receiving device 97a becomes smaller than that of the first light receiving device 96a. Thus, the reflected light converged to have an elliptic section is restricted to the predetermined unit length by the unidimensional mask 982a and part of the reflected light is received by the second light receiving device 97a. Accordingly, the quantity of the reflected light received by the second light receiving device 97a becomes smaller as the front surface (top surface) of the workpiece W becomes higher above the focal point P1 of the first detection laser beam LB1.

Figure 4:
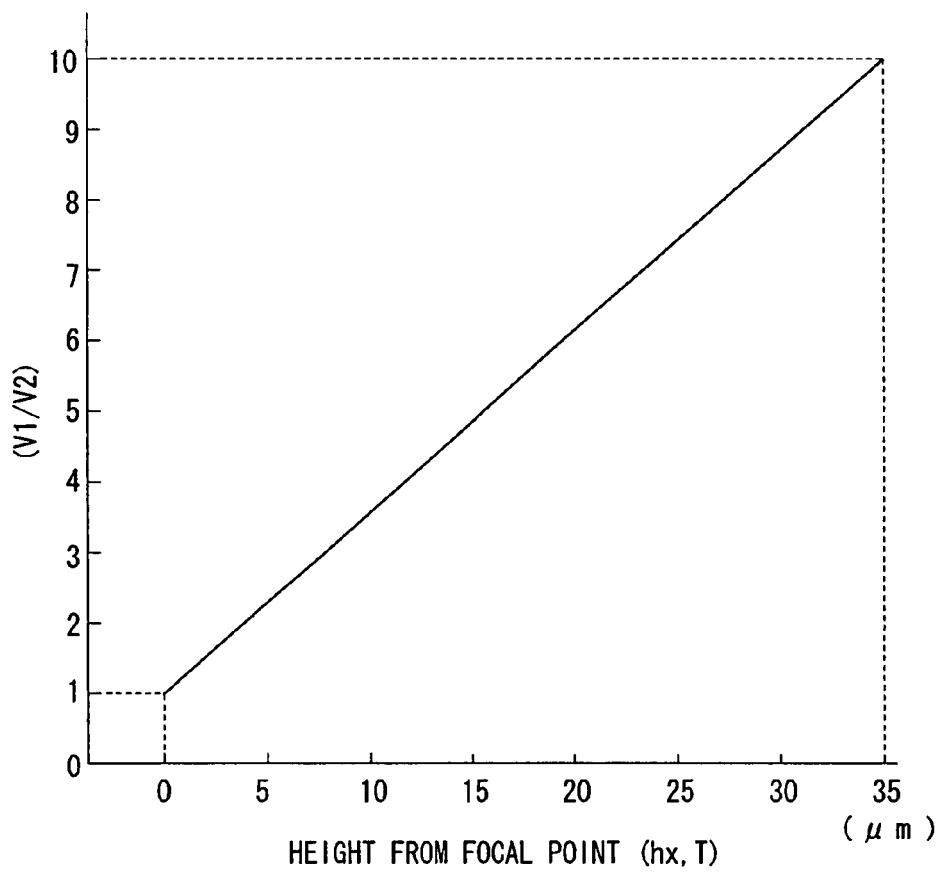
FIG. 4 is a control map showing the relationship between the ratio of a voltage value (V1) output from the first light receiving device to a voltage value (V2) output from the second light receiving device of the via hole depth detector shown in FIG. 2 and the height from an appropriate position to the bottom surface of a via hole.

The relationship between the ratio of the voltage value (V1) output from the above first light receiving device 96a to the voltage value (V2) output from the second light receiving device 97a and the height position of the front surface (top surface) of the workpiece W to which the first detection laser beam LB1 is applied will be described with reference to a control map shown in FIG. 4. In FIG. 4, the horizontal axis shows the height from the focal point P1 and the vertical axis shows the ratio (V1/V2) of the voltage value (V1) output from the first light receiving device 96a to the voltage value (V2) output from the second light receiving device 97a.

In the example shown in FIG. 4, when the above voltage value ratio (V1/V2) is "1", the focal point P1 of the first detection laser beam LB1 is existent at the front surface (top surface) of the workpiece W. As the height from the focal point P1 to the front surface (top surface) of the workpiece W becomes larger, the above voltage value ratio (V1/V2) becomes higher. Therefore, the height hx from the focal point P1 to the front surface (top surface) of the workpiece W can be detected by obtaining the above voltage value ratio (V1/V2). The thickness H1 of the workpiece W can be obtained by adding the height hx from the focal point P1 to the height h1 from the surface (top surface) of the chuck table 36 to the focal point P1 (H1=h1+hx). The control map shown in FIG. 4 is stored in the memory of the control means that is described later.

A description will be subsequently given of the function of the second surface position detection means 9b constituting the via hole depth detector 9.

The second detection laser beam LB2 oscillated from the second detection laser beam oscillation means 90b of the second surface position detection means 9b passes through the second non-deflection beam splitter 92b, reaches the synthetic beam splitter 91 to be deflected toward the third optical path C and is converged by the condenser lens 81 like the above processing pulse laser beam LB and the first detection laser beam LB1. The second detection laser beam LB2 converged as described above is reflected on the front surface (top surface) of the workpiece held on the chuck table 36, and its reflected light reaches the pass filter 93b through the condenser lens 81, the direction changing mirror 7, the synthetic beam splitter 91 and the second non-deflection beam splitter 92b as shown by a broken line in FIG. 2. The reflected light of the first detection laser beam LB1 also reaches the pass filter 93b through the same route as the second detection laser beam LB2. Since the pass filter 93b is so constituted as to transmit only reflected light corresponding to the wavelength (for example, 532 nm) of the second detection laser beam LB2 as described above, the reflected light of the first detection laser beam LB1 is cut off by the pass filter 93b. Therefore, only the reflected light of the second detection laser beam LB2 passes through the pass filter 93b and reaches the non-deflection auxiliary beam splitter 94b.

The reflected light of the second detection laser beam LB2 which has reached the non-deflection auxiliary beam splitter 94b is split into the eighth optical path J and the ninth optical path K. The reflected light split into the eighth optical path J is 100% converged by the condenser lens 95b and received by the first light receiving device 96b. The first light receiving device 96b then supplies a voltage signal corresponding to the quantity of its received light to the control means that is described later. Meanwhile, the reflected light of the second detection laser beam LB2 split into the ninth optical path K is converged unidimensionally by the cylindrical lens 981b, restricted to a predetermined unit length by the unidimensional mask 982b of the light receiving area restricting means 98b and received by the second light receiving device 97b. Then, the second light receiving device 97b supplies a voltage signal corresponding to the quantity of its received light to the control means that is described later.

A description will be subsequently given of the quantity of the reflected light of the second detection laser beam LB2 to be received by the first light receiving device 96b and the second light receiving device 97b. Since the reflected light of the second detection laser beam LB2 to be received by the first light receiving device 96b is 100% converged by the condenser lens 95b, the quantity of received light is constant and the voltage value (V1) output from the first light receiving device 96b is constant (for example, 10 V). Meanwhile, the reflected light of the second detection laser beam LB2 to be received by the second light receiving device 97b is converged unidimensionally by the cylindrical lens 981b, then restricted to the predetermined unit length by the unidimensional mask 982b and received by the second light receiving device 97b. Therefore, the quantity of light received by the second light receiving device 97b changes according to the position of the focal point P2 of the second detection laser beam LB2 focused by the condenser lens 81 of the condenser 8 in the workpiece. Accordingly, the voltage value (V2) output from the second light receiving device 97b changes according to the position of the focal point P2 of the second detection laser beam LB2 in the workpiece.

Figure 5:
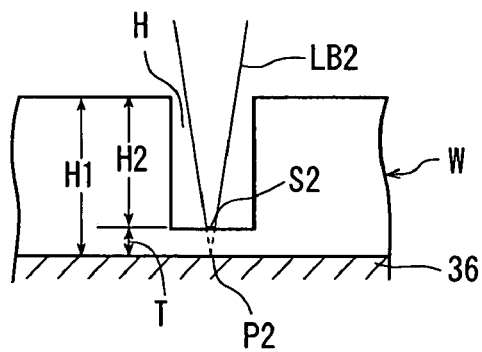
FIG. 5 is an explanatory diagram showing a state where the illuminated area changes according to the application position of a second detection laser beam LB2 illuminated from the second surface position detection means of the via hole depth detector shown in FIG. 2.

For instance, when the second detection laser beam LB2 is to be applied to the bottom surface of the via hole H formed in the workpiece W held on the chuck table 36, the focal point P2 is set to the top surface of the chuck table 36, that is, the undersurface of the workpiece W as shown in FIG. 5. The positioning of the focal point P2 of the second detection laser beam LB2 is carried out by controlling the interval between the two convex lenses 991 and 992 constituting the beam expander 99 as the focal point positioning means. When the second detection laser beam LB2 is applied by setting its focal point P2 to the undersurface of the workpiece W, the second detection laser beam LB2 is reflected at an area S2 on the bottom surface of the via hole H formed in the workpiece W. This reflected light is split into the eighth optical path J and the ninth optical path K by the non-deflection auxiliary beam splitter 94b as described above. Since the reflected light of the area S2 split into the eighth optical path J is 100% converged by the condenser lens 95b, all the quantity of the reflected light is received by the first light receiving device 96b. Meanwhile, since the reflected light of the area S2 split into the ninth optical path K by the non-deflection auxiliary beam splitter 94b is converged unidimensionally by the cylindrical lens 981*b*, its section becomes elliptic. Therefore, as the reflected light having an elliptic section is restricted to the predetermined unit length by the unidimensional mask 982*b*, part of the reflected light split into the ninth optical path K is received by the second light receiving device 97*b*. Accordingly, the quantity of light received by the second light receiving device 97*b* becomes smaller than that of the first light receiving device 96*b*. Thus, the reflected light converged to have an elliptic section is restricted to the predetermined length by the unidimensional mask 982*b*, and part of the reflected light is received by the second light receiving device 97*b*. Therefore, the quantity of the reflected light received by the second light receiving device 97*b* becomes smaller as the bottom surface of the via hole H becomes higher above the focal point P2 of the second detection laser beam LB2.

The relationship between the ratio of the voltage value (V1) output from the first light receiving device 96*b* to the voltage value (V2) output from the second light receiving device 97*b* and the bottom surface of the via hole formed in the workpiece W to which the second detection laser beam LB2 is applied will be described with reference to the control map shown in FIG. 4. The height position of the bottom surface of the via hole H formed in the workpiece W is obtained with reference to the control map shown in FIG. 4 as follows. When the above voltage value ratio (V1/V2) is "1", the bottom surface of the via hole H reaches the undersurface of the workpiece W and the height T from the focal point P2 becomes nil (0). As the height T from the focal point P2 to the bottom surface of the via hole H formed in the workpiece W becomes larger, the above voltage value ratio (V1/V2) becomes higher as shown in FIG. 4. Therefore, the height T from the focal point P2 to the bottom surface of the via hole formed in the workpiece W can be detected by obtaining the above voltage value ratio (V1/V2). Thus, by setting the focal point P2 of the second detection laser beam LB2 to the undersurface of the workpiece W, the above height T becomes the height from the undersurface of the workpiece W to the bottom surface of the via hole H. Therefore, the depth H2 of the via hole H formed in the workpiece W can be obtained by subtracting the height T from the undersurface of the workpiece W to the bottom surface of the via hole H formed in the workpiece W detected by the second surface position detection means 9*b* from the thickness H1 of the workpiece W detected by the above first surface position detection means 9*a* (H2=H1−T).

Returning to FIG. 1, an image pick-up means 11 for detecting the area to be processed by the laser beam application means 52 is mounted onto the end portion of the casing 521 constituting the above laser beam application means 52. This image pick-up means 11 is constituted by an infrared illuminating means for applying infrared radiation to the workpiece, an optical system for capturing infrared radiation irradiated by the infrared illuminating means, and an image pick-up device (infrared CCD) for outputting an electric signal corresponding to infrared radiation captured by the optical system, in addition to an ordinary image pick-up device (CCD) for picking up an image with visible radiation. An image signal picked-up is supplied to the control means that is described later.

The laser beam application unit 5 in the illustrated embodiment has a focal point positioning means 53 as a Z-axis moving means for moving the unit holder 51 along the pair of guide rails 423 and 423 in the direction indicated by the arrow Z (direction perpendicular to the holding surface which is the top surface of the adsorption chuck 361). The focal point positioning means 53 comprises a male screw rod (not shown) arranged between the pair of guide rails 423 and 423 and a drive source such as a pulse motor 532 for rotary-driving the male screw rod. By driving the male screw rod (not shown) in a normal direction or adverse direction with the pulse motor 532, the unit holder 51 and the laser beam application means 52 comprising the condenser 8 are moved along the guide rails 423 and 423 in the direction indicated by the arrow Z. In the illustrated embodiment, the laser beam application means 52 is moved up by driving the pulse motor 532 in a normal direction and moved down by driving the pulse motor 532 in the adverse direction.

The laser beam processing machine 1 in the illustrated embodiment comprises the control means 10. The control means 10 is composed of a computer which comprises a central processing unit (CPU) 101 for carrying out arithmetic processing based on a control program, a read-only memory (ROM) 102 for storing the control program, etc., a read/write random access memory (RAM) 103 for storing the results of operations, a counter 104, an input interface 105 and an output interface 106. Detection signals from the above processing-feed amount detection means 374, the indexing-feed amount detection means 384, the first light receiving device 96*a* and the second light receiving device 97*a* of the first surface position detection means 9*a*, the first light receiving device 96*b* and the second light receiving device 97*b* of the second surface position detection means 9*b* and the image pick-up means 11 are inputted to the input interface 105 of the control means 10. Control signals are outputted to the above pulse motor 372, the pulse motor 382, the pulse motor 432, the pulse motor 532, the processing pulse laser beam oscillation means 6, the first detection laser beam oscillation means 90*a*, the second detection laser beam oscillation means 90*b* and display means 100 from the output interface 106 of the control means 10. The above random access memory (RAM) 103 has a first storage area 103*a* for storing the control map shown in FIG. 4, a second storage area 103*b* for storing data on the design values of the workpiece which will be described later, and other storage areas.

The laser beam processing machine 1 in the illustrated embodiment is constituted as described above, and its function will be described hereinbelow.

Figure 6:
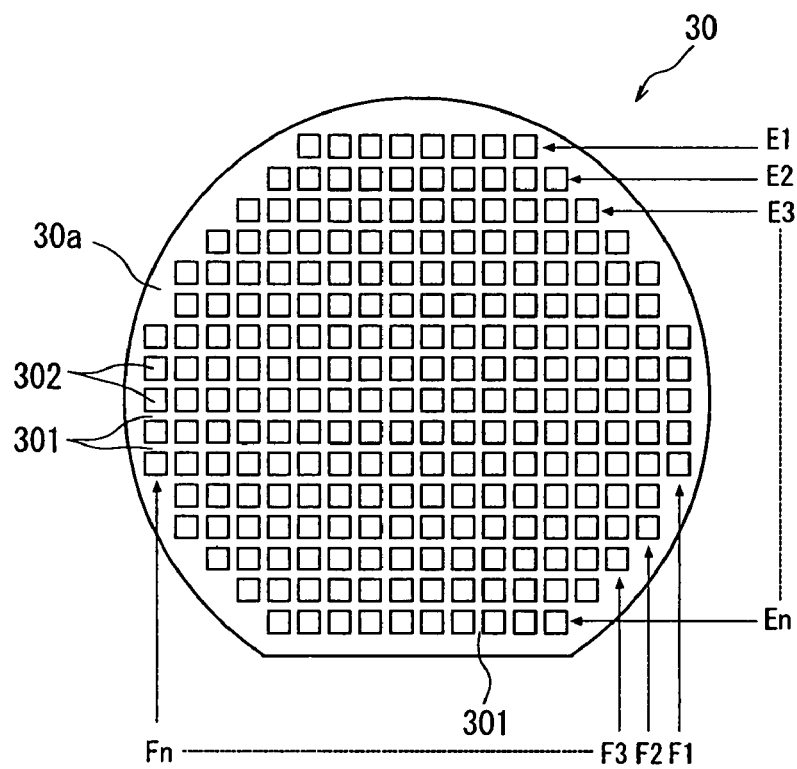
FIG. 6 is a plan view of a semiconductor wafer as a workpiece.
Figure 7:
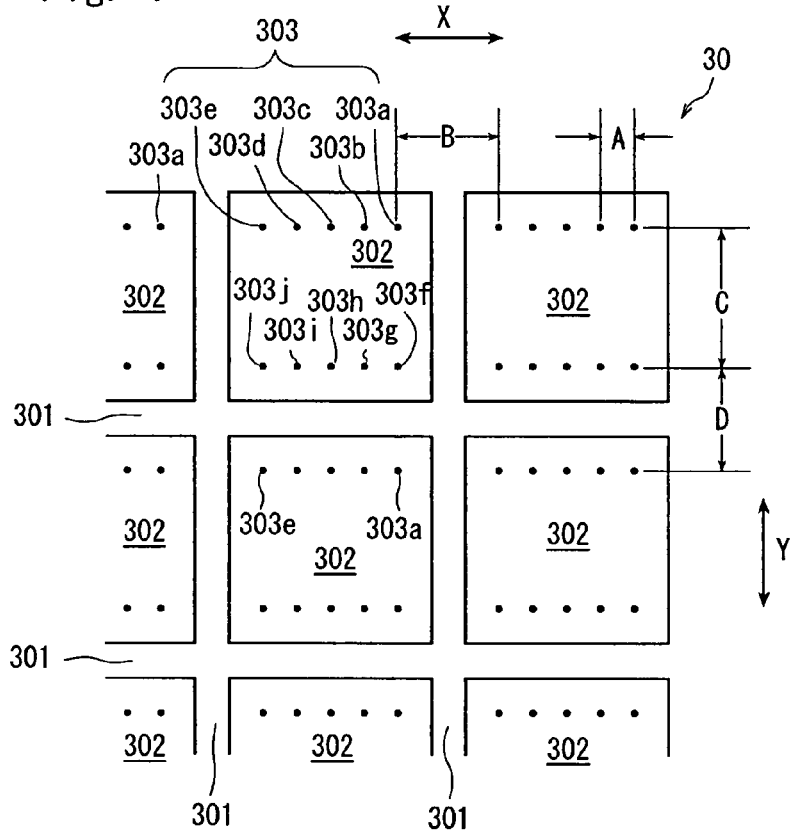
FIG. 7 is a partially enlarged plan view of the semiconductor wafer shown in FIG. 6.

FIG. 6 is a plan view of a semiconductor wafer 30 as the workpiece to be processed by a laser beam. The semiconductor wafer 30 shown in FIG. 6 is, for example, a silicon wafer having a thickness of 100 μm, a plurality of areas are sectioned by a plurality of dividing lines 301 formed in a lattice pattern on the front surface 30*a*, and a device 302 such as IC or LSI is formed in each of the sectioned areas. The devices 302 are all the same in constitution. A plurality of electrodes 303 (303*a* to 303*j*) are formed on the surface of each device 302, as shown in FIG. 7. In the illustrated embodiment, electrodes 303*a* and 303*f*, electrodes 303*b* and 303*g*, electrodes 303*c* and 303*h*, electrodes 303*d* and 303*i*, and electrodes 303*e* and 303*j* are at the same positions in the X direction. Via holes reaching the electrodes 303 from the rear surface 30*b* are formed in portions corresponding to the plurality of electrodes 303 (303*a* to 303*j*), respectively. The intervals A between adjacent electrodes 303 (303*a* to 303*j*) in the X direction (horizontal direction in FIG. 7) and the intervals B between adjacent electrodes in the X direction (horizontal direction in FIG. 7) with the dividing line 301 interposed therebetween, for example, between the electrodes 303*e* and 303*a* out of the electrodes 303 formed on each device 302 are the same in the illustrated embodiment. The intervals C between adjacent electrodes 303 (303*a* to 303*j*) in the Y direction (vertical direction in FIG. 7) and the intervals D between adjacent electrodes in the Y direction (vertical direction in FIG. 7) with the dividing line 301 interposed therebetween, for example, between the electrodes 303f and 303a and between the electrodes 303j and 303e out of the electrodes 303 formed on each device 302 are the same in the illustrated embodiment. The design value data of the semiconductor wafer 30 constituted as described above, which include the numbers of devices 302 disposed in rows E1 to En and columns F1 to Fn shown in FIG. 6 and the above intervals A, B, C and D, are stored in the second storage area 103b of the above random access memory (RAM) 103.

An example of laser processing for forming a via hole in portions corresponding to the electrodes 303 (303a to 303j) of each device 302 formed on the above semiconductor wafer 30 by using the above laser beam processing machine 1 will be described hereinunder.

Figure 8:
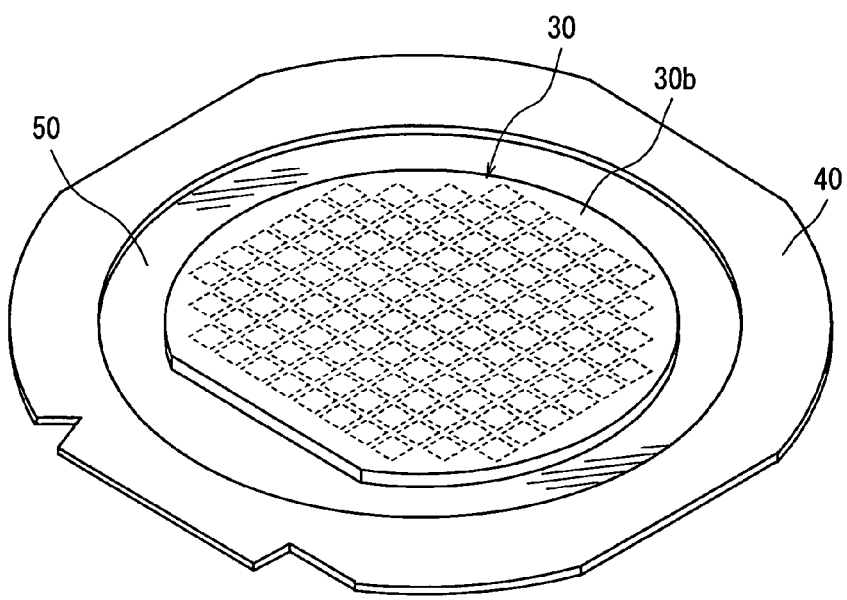
FIG. 8 is a perspective view of the semiconductor wafer shown in FIG. 6 which is put on the surface of a protective tape mounted on an annular frame.

The front surface 30a of the semiconductor wafer 30 constituted as described above is put on a protective tape 50 which is formed of a synthetic resin sheet such as a polyolefin sheet and is mounted on an annular frame 40 as shown in FIG. 8. Therefore, the rear surface 30b of the semiconductor wafer 30 faces up. The protective tape 50 side of the semiconductor wafer 30 supported to the annular frame 40 through the protective tape 50 is placed on the chuck table 36 of the laser beam processing machine 1 shown in FIG. 1. The semiconductor wafer 30 is suction-held on the chuck table 36 through the protective tape 50 by activating the suction means that is not shown. The annular frame 40 is fixed by the clamps 362.

The chuck table 36 suction-holding the semiconductor wafer 30 as described above is brought to a position right below the image pick-up means 11 by the processing-feed means 37. After the chuck table 36 is positioned right below the image pick-up means 11, the semiconductor wafer 30 on the chuck table 36 becomes a state where it is located at the coordinate position shown in FIG. 9. In this state, alignment work is carried out to check whether the dividing lines 301 formed in a lattice pattern on the semiconductor wafer 30 held on the chuck table 36 are parallel to the X direction and the Y direction. That is, an image of the semiconductor wafer 30 held on the chuck table 36 is picked up by the image pick-up means 11 to carry out image processing such as pattern matching, etc. for the alignment work. Although the dividing line 301 formed front surface 30a of the semiconductor wafer 30 faces down at this point, as the image pick-up means 11 is constituted by the infrared illuminating means, an optical system for capturing infrared radiation and an image pick-up device (infrared CCD) for outputting an electric signal corresponding to the infrared radiation as described above, an image of the dividing lines 301 can be picked up through the rear surface 30b of the semiconductor wafer 30.

Thereafter, the chuck table 36 is moved to bring a device 302 at the most left end in FIG. 9 in the top row E1 out of the devices 302 formed on the semiconductor wafer 30 to a position right below the image pick-up means 11. Further, the upper left electrode 303a in FIG. 9 out of the electrodes 303 (303a to 303j) formed on the above device 302 is brought to a position right below the image pick-up means 11. After the image pick-up means 11 detects the electrode 303a in this state, its coordinate values (a1) as first feed start position coordinate values are supplied to the control means 10. The control means 10 stores the coordinate values (a1) in the random access memory (RAM) 103 as first processing-feed start position coordinate values (processing-feed start position detecting step). Since there is a predetermined space between the image pick-up means 11 and the condenser 8 of the laser beam application means 52 in the X direction at this point, a value obtained by adding the interval between the above image pick-up means 11 and the condenser 8 is stored as an X coordinate value.

Figure 9:
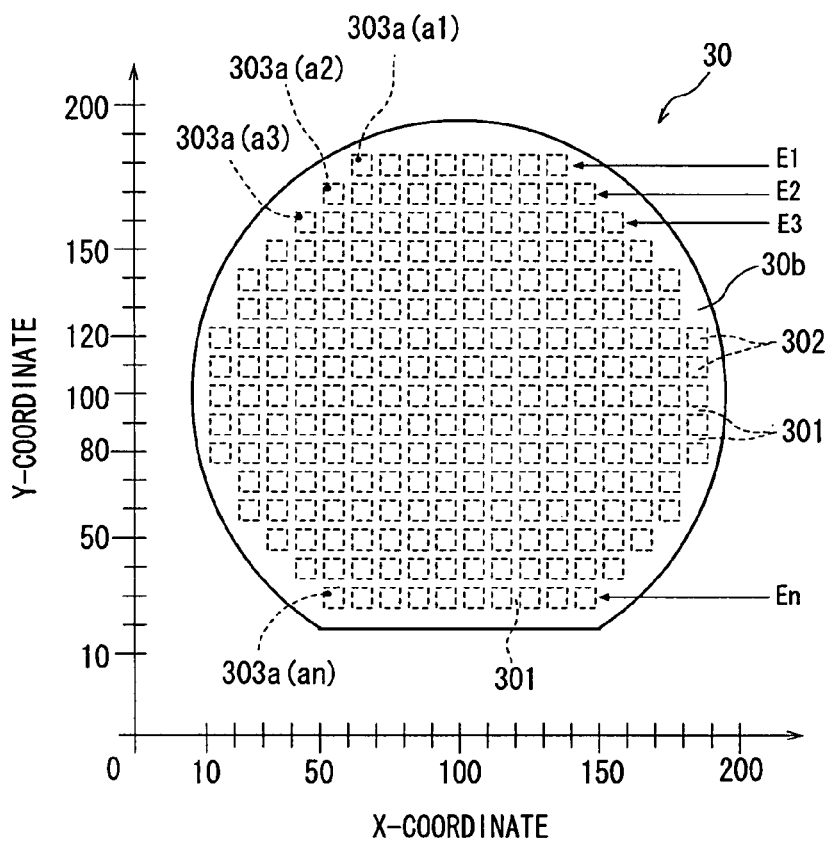
FIG. 9 is an explanatory diagram showing the relationship between the semiconductor wafer shown in FIG. 6 and its coordinate position in a state where it is held at a predetermined position of the chuck table of the laser beam processing machine shown in FIG. 1.

After the first processing-feed start position coordinate values (a1) of the device 302 in the top-most row E1 in FIG. 9 are detected as described above, the chuck table 36 is moved a distance corresponding to the interval between dividing lines 301 in the Y direction and moved in the X direction to bring a device 302 at the most left end in the second row E2 from the top-most in FIG. 9 to a position right below the image pick-up means 11. Further, the upper left electrode 303a in FIG. 9 out of the electrodes 303 (303a to 303j) formed on the above device 302 is brought to a position right below the image pick-up means 11. After the image pick-up means 11 detects the electrode 303a in this state, its coordinate values (a2) are supplied to the control means 10 as second processing-feed start position coordinate values. The control means 10 stores the coordinate values (a2) in the random access memory (RAM) 103 as second processing-feed start position coordinate values. Since there is the predetermined space between the image pick-up means 11 and the condenser 8 of the laser beam application means 52 in the X direction as described above, a value obtained by adding the interval between the image pick-up means 11 and the condenser 8 is stored as an X coordinate value. Thereafter, the control means 10 carries out the above indexing-feed and processing-feed start position detecting steps repeatedly up to the bottom row En in FIG. 9 to detect the processing-feed start position coordinate values (a3 to an) of the devices 302 formed in the rows and store them in the random access memory (RAM) 103.

Figure 10:
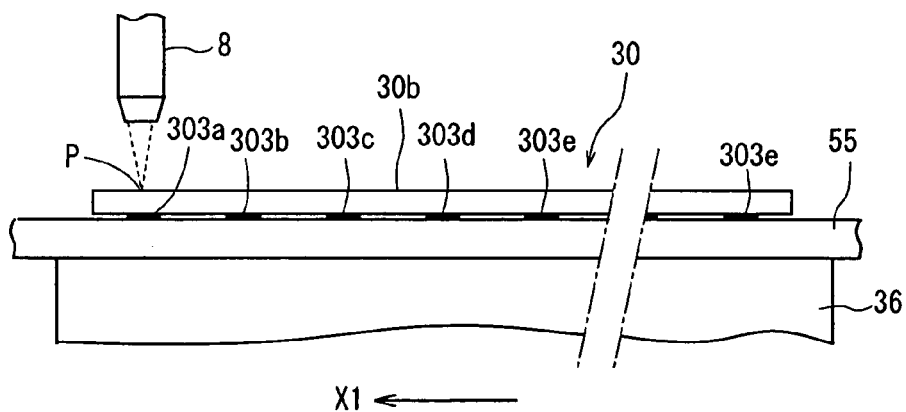
FIG. 10 is an explanatory diagram showing a laser processing step for forming a laser-processed via hole in the semiconductor wafer shown in FIG. 6 by the laser beam processing machine shown in FIG. 1.

Next comes the laser-processing step of forming a laser-processed via hole in portions corresponding to the electrodes 303 (303a to 303j) formed on each device 302 of the semiconductor wafer 30. In the laser processing step, the processing-feed means 37 is first activated to move the chuck table 36 so as to bring the point of the first processing-feed start position coordinate values (a1) stored in the above random access memory (RAM) 103 to a position right below the condenser 8 of the laser beam application means 52. FIG. 10 shows a state where the point of the first processing-feed start position coordinate values (a1) has been positioned right below the condenser 8. From the state shown in FIG. 10, the control means 10 controls the laser beam application means 52 to apply the processing laser beam LB from the condenser 8.

The processing conditions in the above laser processing step are set as follows, for example.

Figure 11:
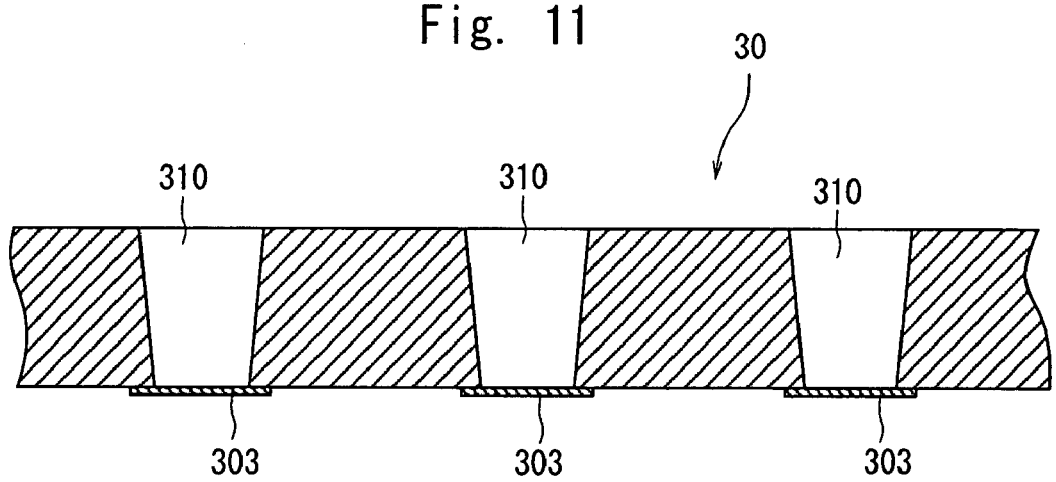
FIG. 11 is an enlarged sectional view of the principal portion of the semiconductor wafer in which laser-processed via holes have been formed by the laser processing step shown in FIG. 10.

Light source: LD excited Q switch Nd:YVO4 pulse laser
Wavelength: 355 nm
Energy density: 30 J/cm$^2$
Focal spot diameter: 70 μm When the laser processing step is carried out under the above processing conditions, a via hole having a depth of about 2 μm per one pulse of the pulse laser beam can be formed in the silicon wafer. Therefore, a laser-processed via hole 310 reaching the electrode 303 can be formed by irradiating 50 pulses of the pulse laser beam to a silicon wafer having a thickness of 100 μm as shown in FIG. 11.

After the laser processing step is carried out at the point of the first processing-feed start position coordinate values (a1) as described above, the processing-feed means 37 is activated to move the chuck table 36 a distance corresponding to the above interval A so as to bring a portion corresponding to the electrode 303b to a position right below the condenser 8 of the laser beam application means 52. Then, the above laser processing step is carried out. By bringing portions corresponding to all the electrodes 303 formed on the semiconductor wafer 30 to a position right below the condenser 8 of the laser beam application means 52 and carrying out the above laser processing step as described above, laser-processed via holes 310 reaching the electrodes 303 can be formed from the rear surface 30b in the semiconductor wafer 30.

Although laser-processed via holes 310 reaching the electrodes 303 can be formed from the rear surface 30b in the semiconductor wafer 30 by carrying out the above laser processing step, some laser-processed via holes 310 may not reach the electrodes 303. Therefore, it is necessary to check if the laser-processed via holes 310 have reached, the electrodes 303 or not. In the illustrated laser beam processing machine 1, the above via hole depth detector 9 is activated to carry out the step of detecting the depth of each laser-processed via hole 310 formed in the semiconductor wafer 30.

Figure 12:
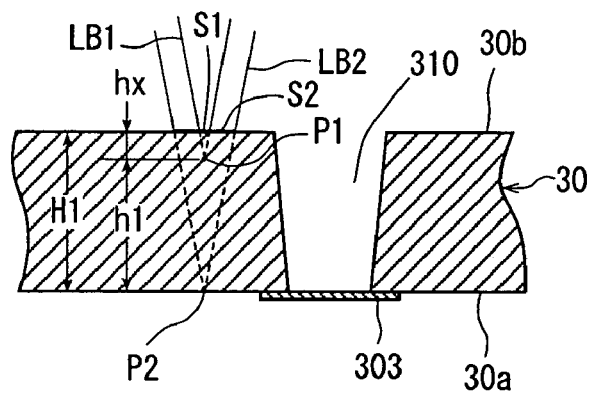
FIGS. 12(a) and 12(b) are explanatory diagrams showing the via hole depth detection step which is carried out by the via hole depth detector provided in the laser beam processing machine shown in FIG. 1.
Figure 12:
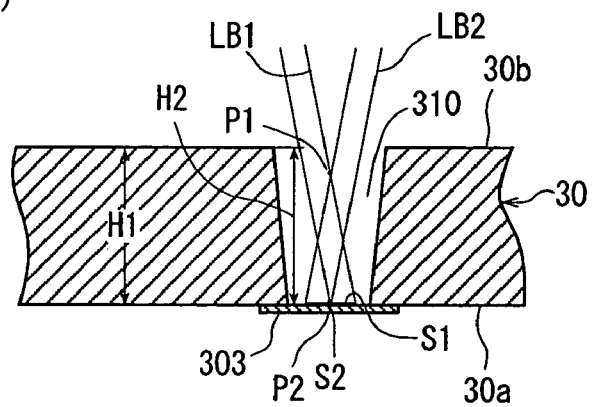

The depth detection step is carried out by bringing the top surface (rear surface 30b) of the semiconductor wafer 30 and each laser-processed via hole 310 to a position right below the condenser 8 sequentially, oscillating the first detection laser beam LB1 from the first detection laser beam oscillation means 90a of the first surface position detection means 9a constituting the via hole depth detector 9 and the second detection laser beam LB2 from the second detection laser beam oscillation means 90b of the second surface position detection means 9b constituting the via hole depth detector 9, and applying them to the semiconductor wafer 30 from the condenser 8 as shown in FIGS. 12(a) and 12(b). The positioning of each laser-processed via hole 310 formed in the semiconductor wafer 30 can be carried out by moving the chuck table 36 based on the coordinate data of the electrodes 303 stored in the random access memory (RAM) 103 of the control means 10 in the same manner as in the above laser processing step.

Examples of the first detection laser beam LB1 and the second detection laser beam LB2 irradiated in the depth detection step are described below.

(1) First Detection Laser Beam LB1
  Light source: He—Ne continuous wave laser
  Wavelength: 633 nm
  Average output: 2 to 3 mW
(2) Second Detection Laser Beam LB2
  Light Source: YAG Continuous Wave Laser
  Wavelength: 532 nm
  Average output: 2 to 3 mW The distance between the focal point P1 of the first detection laser beam LB1 and the focal point P2 of the second detection laser beam LB2 is adjusted by controlling the interval between the two convex lenses 991 and 992 constituting the beam expander 99 as the above focal point positioning means. For instance, to form a via hole having a depth of 100 μm and reaching the electrode 303 in the semiconductor wafer 30 having a thickness of 100 μm, the distance between the focal point P1 of the first detection laser beam LB1 and the focal point P2 of the second detection laser beam LB2 is set to 90 to 100 μm. The focal point P2 of the second detection laser beam LB2 is set to the undersurface (front surface 30a) of the semiconductor wafer 30, that is, the rear surface of the electrode 303 by the focal point positioning means 53 as the Z-axis moving means as shown in FIG. 12(a). Therefore, the focal point P1 of the first detection laser beam LB1 is positioned h1 above the undersurface (front surface 30a) of the semiconductor wafer 30.

The first detection laser beam LB1 is reflected at an area S1 and the second detection laser beam LB2 is reflected at an area S2 on the top surface (rear surface 30b) of the semiconductor wafer 30 respectively, and the reflected light of the first detection laser beam LB1 is received by the first light receiving device 96a and the second light receiving device 97a of the first surface position detection means 9a as described above. Therefore, the height hx from the focal point P1 to the top surface (rear surface 30b) of the semiconductor wafer 30 can be detected from the ratio (V1/V2) of the voltage value (V1) output from the first light receiving device 96a to the voltage value (V2) output from the second light receiving device 97a based on the control map shown in FIG. 4 as described above. The thickness H1 of the semiconductor wafer 30 can be obtained by adding this height hx to the height h1 from the undersurface (front surface 30a) of the semiconductor wafer 30 to the focal point P1 (H1=h1+hx). Although the reflected light of the second detection laser beam LB2 is received by the first light receiving device 96b and the second light receiving device 97b of the second surface position detection means 9b as described above, as the area of the reflected light is very large, the ratio (V1/V2) of the voltage value (V1) output from the first light receiving device 96b to the voltage value (v2) output from the second light receiving device 97b is extremely high, whereby the control means 10 makes it invalid as abnormal data. Thus, the thickness H1 of the semiconductor wafer 30 detected by the first surface position detection means 9a based on the first detection laser beam LB1 is stored in the random access memory (RAM) 103 of the control means 10.

Next, when the laser-processed via holes 310 formed in the semiconductor wafer 30 are brought to a position right below the condenser 11 sequentially and the first detection laser beam LB1 and the second detection laser beam LB2 are applied to the top surface (rear surface 30b) of the semiconductor wafer 30, the focal point P1 of the first detection laser beam LB1 is located h1 (at a lower position of a depth hx from the top surface (rear surface 30b) of the semiconductor wafer 30) above the undersurface (front surface 30a) of the semiconductor wafer 30 as shown in FIG. 12(a). Meanwhile, the focal point P2 of the second detection laser beam LB2 is located at the undersurface (front surface 30a) of the semiconductor wafer 30. The first detection laser beam LB1 is reflected at an area S1 and the second detection laser beam LB2 is reflected at an area S2 on the laser-processed via hole 310 formed in the semiconductor wafer 30 respectively on the bottom surface of the laser-processed via hole 310, and the reflected light of the second detection laser beam LB2 is received by the first light receiving device 96b and the second light receiving device 97b of the second surface position detection means 9b as described above. Therefore, the height T from the focal point P2 to the bottom surface of the laser-processed via hole 310 formed in the semiconductor wafer 30 can be detected from the ratio (V1/V2) of the voltage value (V1) output from the first light receiving device 96b to the voltage value (V2) output from the second light receiving device 97b based on the control map shown in FIG. 4. This height T is from the undersurface (front surface 30a) of the semiconductor wafer 30 to the bottom surface of the laser-processed via hole 310 because the focal point P2 is located at the undersurface (front surface 30a) of the semiconductor wafer 30. Since the laser-processed via hole 310 reaches the undersurface (front surface 30a) of the semiconductor wafer 30, that is, the electrode 303 in the illustrated embodiment shown in FIG. 12(b), the height T becomes nil (0). Meanwhile, although the reflected light of the first detection laser beam LB1 is received by the first light receiving device 96a and the second light receiving device 97a of the first surface position detection means 9a, as the focal spot area of the reflected light is very large, the ratio (V1/V2) of the voltage value (V1) output from the first light receiving device 96a to the voltage value (V2) output from the second light receiving device 97a is extremely high, whereby the control means 10 makes it invalid as abnormal data. The height T (height from the undersurface (front surface 30) of the semiconductor wafer 30 to the bottom surface of the laser-processed via hole 310) from the focal point P2 to the bottom surface of the laser-processed via hole 310 detected by the second surface position detection means 9b based on the second detection laser beam LB2 is stored in the random access memory (RAM) 103 of the control means 10.

The control means 10 obtains the depth H2 of the laser-processed via hole 310 formed in the semiconductor wafer 30 based on the detected thickness H1 of the semiconductor wafer 30 and the height T (height from the undersurface (front surface 30a) of the semiconductor wafer 30 to the bottom surface of the laser-processed via hole 310) from the focal point P2 to the bottom surface of the laser-processed via hole 310. That is, the control means 10 obtains the depth H2 of the laser-processed via hole 310 formed in the semiconductor wafer 30 by subtracting the height T (height from the undersurface (front surface 30a) of the semiconductor wafer 30 to the bottom surface of the laser-processed via hole 310) from the focal point P2 to the bottom surface of the laser-processed via hole 310 from the thickness H1 of the semiconductor wafer 30 (H2=H1-T). When the depth H2 of the laser-processed via hole 310 is equal to the thickness H1 of the semiconductor wafer 30, the laser-processed via hole 310 reaches the bottom surface, that is, the rear surface of the electrode 303. Meanwhile, when the value of the depth H2 of the laser-processed via hole 310 is positive, the laser-processed via hole 310 does not reach the bottom surface. The height T (unprocessed thickness) from the focal point P2 to the bottom surface of the above laser-processed via hole 310 and the depth H2 of the laser-processed via hole 310 are stored in the random access memory (RAM) 103 of the control means 10.

The above depth detection step is carried out on all the laser-processed via holes 310 formed in the semiconductor wafer 30 and then, the control means 10 obtains the heights T (unprocessed thicknesses) from the focal point P2 to the bottom surfaces of the laser-processed via holes 310 and the depths H2 of the laser-processed via holes 310 based on the control map shown in FIG. 4 to prepare the decision map of the laser-processed via holes 310 as shown in FIG. 13.

The control means 10 stores data on the reflectance of silicon forming the wafer and the reflectance of a metal such as copper forming the electrodes in the predetermined area of the random access memory (RAM) 103 and judges whether the output value from the first light receiving device 96b of the second surface position detection means 9b is a value corresponding to the reflectance of the electrodes 303. That is, as the reflectance of silicon is 57.48% and the reflectance of copper forming the electrodes 303 is 43.27%, the quantity of light received by the first light receiving device 96b of the second surface position detection means 9b changes according to whether the laser-processed via hole 310 reaches the electrode 303 or not. Therefore, when the output value from the first light receiving device 96b is a value corresponding to the reflectance of copper, it is known that the laser-processed via hole 310 formed in the semiconductor wafer 30 reaches the electrode 303 surely. Consequently, even if the depth H2 of the laser-processed via hole 310 is calculated as not equal to the thickness H1 of the semiconductor wafer 30, it can be judged that the laser-processed via hole 310 reaches the electrode 303.

After the decision map shown in FIG. 13 is prepared as described above, the control means 10 sets the number of re-processing pulses for laser-processed via holes 310 which have been judged as not reaching the electrodes 303 (303f on E1 and 303b on En in the embodiment shown in FIG. 13). That is, since a laser-processed via hole having a depth of about 2 μm can be formed with one pulse of the pulse laser beam under the above processing conditions, the number of re-processing pulses is set to 5 for the laser-processed via hole 310 which should reach the electrode 303f on E1 because it must be made 10 μm deeper and the number of re-processing pulses is set to 10 for the laser-processed via hole 310 which should reach the electrode 303b on En because it must be made 20 μm deeper. The decision map prepared as described above is displayed on the display means 100.

After the numbers of re-processing pulses are set in the decision map shown in FIG. 13, the control means 10 moves the chuck table 36 to bring the point of the coordinate values of the electrode 303f on E1 to a position right below the condenser 8 and applies 5 pulses of the processing pulse laser beam LB and then, moves the chuck table 36 to bring the point of the coordinate values of the electrode 303b on En right below the condenser 8 and applies 10 pulses of the processing pulse laser beam LB. As a result, the laser-processed via hole 310 which has been determined not to reach the electrode 303f on E1 and the laser-processed via hole 310 which has been determined not to reach the electrode 303b on En are re-processed so as to reach these electrodes 303.

Another embodiment of the via hole depth detector 9 according to the present invention will be described with reference to FIG. 14. In the via hole depth detector 9 shown in FIG. 14, a common detection laser beam oscillation means for oscillating a detection laser beam is provided, parts substantially the same as the constituent parts of the via hole depth detector 9 shown in FIG. 2 are given the same reference numbers, and their detailed descriptions are omitted.

Figure 14:
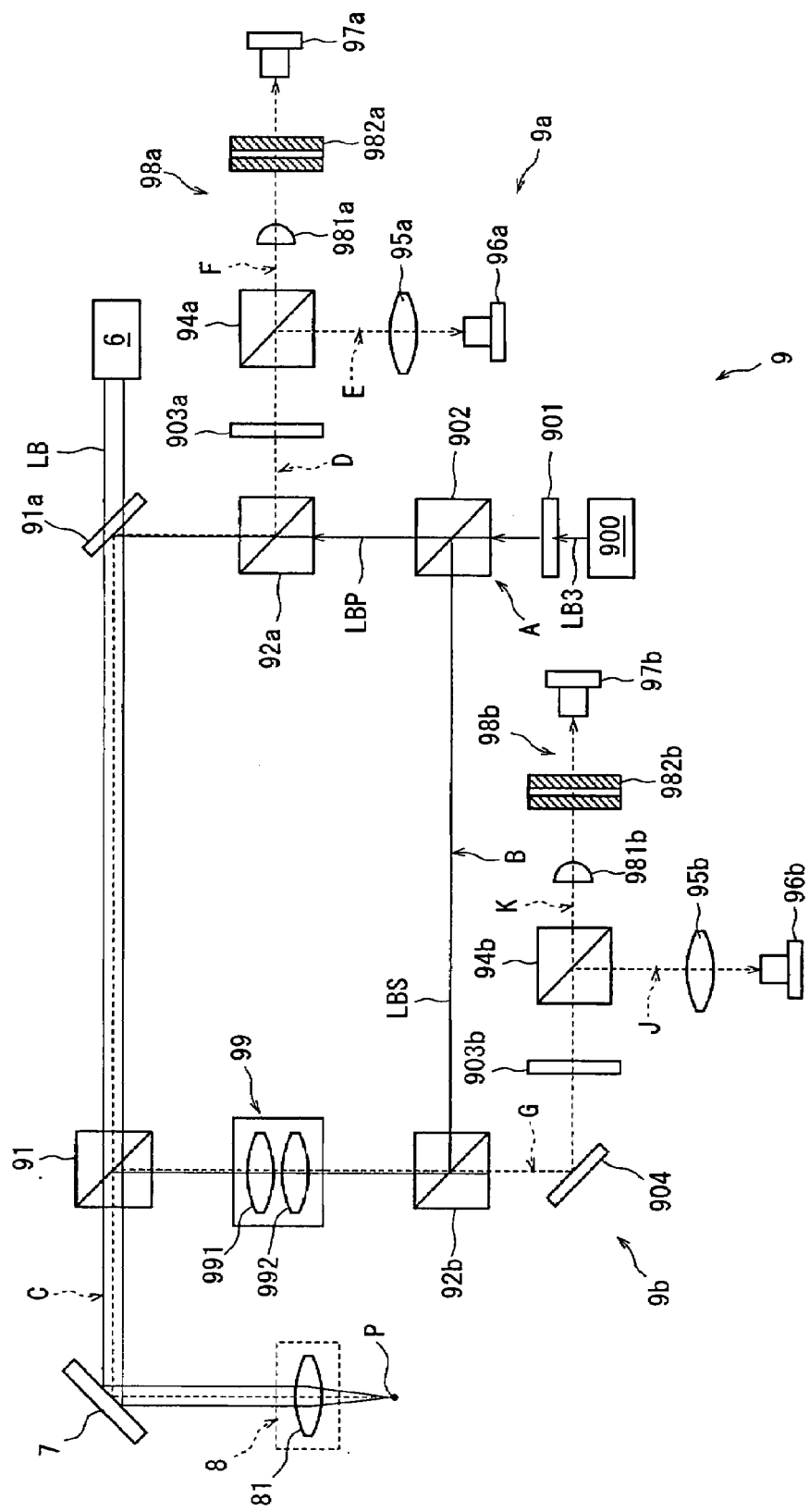
FIG. 14 is a block diagram showing another embodiment of the via hole depth detector constituted according to the present invention.

The via hole depth detector 9 shown in FIG. 14 comprises the first surface position detection means 9a and the second surface position detection means 9b, and there is further provided a common detection laser beam oscillation means 900. As this detection laser beam oscillation means 900 may be used a He—Ne laser oscillator for oscillating a detection laser beam LB3 having a wavelength of 633 nm, like the first detection laser beam oscillation means 90a of the via hole depth detector 9 shown in FIG. 2. A deflection plate 901 and a deflection beam splitter 902 are interposed between the detection laser beam oscillation means 900 and the first non-deflection beam splitter 92a of the first surface position detection means 9a and the second non-deflection beam splitter 92b of the second surface position detection means 9b. The P wave LBP and S wave LBS of the detection laser beam LB3 oscillated from the detection laser beam oscillation means 900 are limited to predetermined angles by the deflection plate 901. The P wave LBP limited to a predetermined angle by the deflection plate 901 is directed toward the first non-deflection beam splitter 92a installed in the first optical path A of the first surface position detection means 9a by the deflection beam splitter 902. Meanwhile, the S wave LBS obtained by the deflection plate 901 is directed toward the second non-deflection beam splitter 92b installed in the second optical path B of the second surface position detection means 9b by the deflection beam splitter 902.

The P wave LBP of the detection laser beam LB3 directed toward the first non-deflection beam splitter 92a of the first surface position detection means 9a is converged by the condenser lens 81 through the first non-deflection beam splitter 92a, the dichroic half mirror 91a, the synthetic beam splitter 91 and the direction changing mirror 7 as in the via hole depth detector 9 shown in FIG. 2. The P wave LBP of the detection laser beam LB3 converged as described above is reflected on the front surface (top surface) of the workpiece held on the chuck table 36 shown in FIG. 1, and its reflected light reaches the pass filter 903a through the condenser lens 81, the direction changing mirror 7, the synthetic beam splitter 91, the dichroic half mirror 91a and the first non-deflection beam splitter 92a as shown by a broken line in FIG. 14. The reflected light of the S wave LBS of the detection laser beam LB3 also reaches the pass filter 903a through the same route as the P wave LBP of the detection laser beam LB3 as will be described later. Since this pass filter 903a is so constituted as to transmit only the P wave, the reflected light of the S wave LBS is cut off by the pass filter 903a. Therefore, only the reflected light of the P wave LBP of the detection laser beam LB3 passes through the pass filter 903a and reaches the non-deflection auxiliary beam splitter 94a.

The reflected light of the P wave LBP of the detection laser beam LB3 which has reached the non-deflection auxiliary beam splitter 94a is split into the fifth optical path E and the six optical path F, like in the first surface position detection means 9a shown in FIG. 2. The reflected light split into the fifth optical path E is 100% converged by the condenser lens 95a and received by the first light receiving device 96a. And, the first light receiving device 96a supplies a voltage signal corresponding to the quantity of its received light to the control means 10. Meanwhile, the reflected light of the P wave LBP of the detection laser beam LB3 split into the sixth optical path F is converged unidimensionally by the cylindrical lens 981a, restricted to the predetermined unit length by the unidimensional mask 982a of the light receiving area restricting means 98a and received by the second light receiving device 97a. And, the second light receiving device 97a supplies a voltage signal corresponding to the quantity of its received light to the control means 10.

Thus, the control means 10 can obtain the thickness H1 of the semiconductor wafer 30 based on the voltage signals supplied from the first light receiving device 96a and the second light receiving device 97a of the first surface position detection means 9a as described above.

The S wave LBS of the detection laser beam LB3 deflected toward the second non-deflection beam splitter 92b of the second surface position detection means 9b is converged by the condenser lens 81 through the second non-deflection beam splitter 92b, the beam expander 99, the synthetic beam splitter 91 and the direction changing mirror 7, like in the via hole depth detector 9 shown in FIG. 2. The S wave LBS of the detection laser beam LB3 converged as described above is reflected on the front surface (top surface) of the workpiece held on the chuck table 36 shown in FIG. 1, and its reflected light reaches the pass filter 903b through the condenser lens 81, the direction changing mirror 7, the synthetic beam splitter 91, the beam expander 99, the second non-deflection beam splitter 92b and the direction changing mirror 904 as shown by a broken line in FIG. 14. The reflected light of the P wave LBP of the detection laser beam LB3 also reaches the pass filter 903b through the same route as the S wave LBS of the detection laser beam LB3. Since this pass filter 903b is so constituted as to transmit only the S wave LBS, the reflected light of the P wave LBP is cut off by the pass filter 903b. Therefore, only the reflected light of the S wave LBS of the detection laser beam LB3 passes through the pass filter 903b and reaches the non-deflection auxiliary beam splitter 94b.

The reflected light of the S wave LBS of the detection laser beam LB3 which has reached the non-deflection auxiliary beam splitter 94b is split into the eighth optical path J and the ninth optical path K. The reflected light split into the eighth optical path J is 100% converged by the condenser lens 95b and received by the first light receiving device 96b. And, the first light receiving device 96b supplies a voltage signal corresponding to the quantity of its received light to the control means 10. Meanwhile, the reflected light of the S wave LBS of the detection laser beam LB3 split into the ninth optical path K is converged unidimensionally by the cylindrical lens 981b, restricted to the predetermined unit length by the unidimensional mask 982b of the light receiving area restricting means 98b and received by the second light receiving device 97b. And, the second light receiving device 97b supplies a voltage signal corresponding to the quantity of its received light to the control means 10.

Thus, the control means 10 can obtain the thickness H1 of the semiconductor wafer 30 and the height T from the undersurface (front surface 30a) of the semiconductor wafer 30 to the bottom surface of the laser-processed via hole 310 based on the voltage signals supplied from the first light receiving device 96a and the second light receiving device 97a of the first surface position detection means 9a and the first light receiving device 96b and the second light receiving device 97b of the second surface position detection means 9b, as described above. Thereafter, the control means 10 obtains the depth H2 of the laser-processed via hole 310 by subtracting the height T from the undersurface (front surface 30a) of the semiconductor wafer 30 to the bottom surface of the laser-processed via hole 310 from the thickness H1 of the semiconductor wafer 30 (H2=H1−T) and prepares the decision map of the laser-processed via holes 310 as shown in FIG. 13 based on the heights T from the undersurface (front surface 30a) of the semiconductor wafer 30 to the bottom surfaces of the laser-processed via holes 310 and the depths H2 of the laser-processed via holes 310.

What is claimed is:

1. A via hole depth detector for detecting the depth of a via hole formed in a workpiece held on the holding surface of a chuck table, comprising:
    a first surface position detection means which comprises a first detection laser beam oscillation means for oscillating a first detection laser beam having a predetermined wavelength to a first optical path and detects the height position of an illuminated portion of the workpiece based on the reflected light of the first detection laser beam;
    a second surface position detection means which has a second detection laser beam oscillation means for oscillating a second detection laser beam having a wavelength different from the wavelength of the first detection laser beam to a second optical path and detects the height position of an illuminated portion of the workpiece based on the reflected light of the second detection laser beam;
    a synthetic beam splitter for guiding the first detection laser beam oscillated to the first optical path and the second detection laser beam oscillated to the second optical path to a third optical path;
    a condenser which is installed in the third optical path and converges the first detection laser beam and the second detection laser beam to apply them to the workpiece held on the chuck table;
    a focal point positioning means which is installed in the first or second optical path and changes the position of the focal point of the first detection laser beam or the second detection laser beam; and
    a control means for obtaining the depth of a via hole formed in the workpiece based on a detection value obtained by the first surface position detection means and a detection value obtained by the second surface position detection means.

2. The via hole depth detector according to claim 1, wherein the first surface position detection means comprises a first non-deflection beam splitter which is installed in the first optical path and guides light reflected from the workpiece to a fourth optical path, a pass filter which is installed in the fourth optical path and transmits only reflected light having a wavelength corresponding to that of the first detection laser beam out of the reflected light split by the first non-deflection beam splitter, a non-deflection auxiliary beam splitter for splitting the reflected light passing through the pass filter into a fifth optical path and a sixth optical path, a first light receiving device which receives 100% of the reflected light split into the fifth optical path by the non-deflection auxiliary beam splitter, a second light receiving device which receives the reflected light split into the sixth optical path by the non-deflection auxiliary beam splitter, and a light receiving area restricting means which is installed in the sixth optical path and restricts the light receiving area of the reflected light to be received by the second light receiving device;

the second surface position detection means comprises a second non-deflection beam splitter which is installed in the second optical path and guides light reflected from the workpiece to a seventh optical path, a pass filter which is installed in the seventh optical path and transmits only reflected light having a wavelength corresponding to that of the second detection laser beam out of the reflected light guided by the second non-deflection beam splitter, a non-deflection auxiliary beam splitter for splitting the reflected light passing through the pass filter into an eighth optical path and a ninth optical path, a first light receiving device which receives 100% of the reflected light split into the eighth optical path by the non-deflection auxiliary beam splitter, a second light receiving device which receives the reflected light split into the ninth optical path by the non-deflection auxiliary beam splitter, and a light receiving area restricting means which is installed in the ninth optical path and restricts the light receiving area of the reflected light to be received by the second light receiving device; and the control means calculates the ratio of the quantity of light received by the first light receiving device to the quantity of light received by the second light receiving device of the first surface position detection means based on detection signals from the first light receiving device and the second light receiving device to obtain the height position of the top surface of the workpiece or the height position of the bottom surface of a via hole based on the ratio, calculates the ratio of the quantity of light received by the first light receiving device to the quantity of light received by the second light receiving device of the second surface position detection means based on detection signals from the first light receiving device and the second light receiving device to obtain the height position of the bottom surface of the via hole or the height position of the top surface of the workpiece based on the ratio, and obtains the depth of the via hole formed in the workpiece based on the height position of the top surface of the workpiece and the height position of the bottom surface of the via hole.

3. The via hole depth detector according to claim 2, wherein the control means comprises a memory having a storage area for storing a control map showing the relationship between the ratio of the quantity of light received by the first light receiving device to the quantity of light received by the second light receiving device of the first surface position detection means or the second surface position detection means and the height position of a portion illuminated by the first detection laser beam or the second detection laser beam, calculates the ratio of the quantity of light received by the first light receiving device to the quantity of light received by the second light receiving device of the first surface position detection means based on detection signals from the first light receiving device and the second light receiving device to obtain the height position of the top surface of the workpiece or the height position of the bottom surface of the via hole by collating the ratio with the control map, calculates the ratio of the quantity of light received by the first light receiving device to the quantity of light received by the second light receiving device of the second surface position detection means based on detection signals from the first light receiving device and the second light receiving device to obtain the height position of the bottom surface of the via hole or the height position of the top surface of the workpiece by collating the ratio with the control map, and obtains the depth of the via hole formed in the workpiece based on the height position of the top surface of the workpiece and the height position of the bottom surface of the via hole.

4. The via hole depth detector according to claim 2, wherein the memory of the control means has a storage area for storing data on the reflectances of a plurality of substances and the control means judges whether the via hole formed in the workpiece reaches some other substance from the processed substance based on the amount of light received by the first light receiving device of the first surface position detection means or the second surface position detection means.

5. A via hole depth detector for detecting the depth of a via hole formed in a workpiece held on the holding surface of a chuck table, comprising:

a detection laser beam oscillation means for oscillating a detection laser beam;

a deflection beam splitter for splitting the detection laser beam oscillated by the detection laser beam oscillator into a P wave and an S wave and guiding them to a first optical path and a second optical path, respectively;

a synthetic beam splitter for guiding the P wave and S wave of the detection laser beam split by the deflection beam splitter to a third optical path;

a condenser which is installed in the third optical path and converges the P wave and S wave of the detection laser beam to apply them to the workpiece held on the chuck table;

a focal point positioning means which is installed in the first or second optical path and changes the focal point position of the P wave or S wave of the detection laser beam;

a first surface position detection means for detecting the height position of an illuminated portion of the workpiece based on the reflected light of the P wave or S wave of the detection laser beam applied to the workpiece from the condenser;

second surface position detection means for detecting the height position of an illuminated portion of the workpiece based on the reflected light of the S wave or P wave of the detection laser beam applied to the workpiece from the condenser; and a control means for obtaining the depth of a via hole formed in the workpiece based on a detection value obtained by the first surface position detection means and a detection value obtained by the second surface position detection means.

6. The via hole depth detector according to claim 5, wherein the first surface position detection means comprises a first non-deflection beam splitter which is installed in the first optical path and guides light reflected from the workpiece to a fourth optical path, a pass filter which is installed in the fourth optical path and transmits only the P wave or S wave of the detection laser beam out of the reflected light guided by the first non-deflection beam splitter, a non-deflection auxiliary beam splitter for splitting the reflected light passing through the pass filter into a fifth optical path and a sixth optical path, a first light receiving device which receives 100% of the reflected light split into the fifth optical path by the non-deflection auxiliary beam splitter, a second light receiving device which receives the reflected light split into the sixth optical path by the non-deflection auxiliary beam splitter, and a light receiving area restricting means which is installed in the sixth optical path and restricts the light receiving area of the reflected light to be received by the second light receiving device;

the second surface position detection means comprises a second non-deflection beam splitter which is installed in the second optical path and guides light reflected from the workpiece to a seventh optical path, a pass filter which is installed in the seventh optical path and transmits only the S wave or P wave of the detection laser beam out of the reflected light guided by the second non-deflection beam splitter, a non-deflection auxiliary beam splitter for splitting the reflected light passing through the pass filter into an eighth optical path and a ninth optical path, a first light receiving device which receives 100% of the reflected light split into the eighth optical path by the non-deflection auxiliary beam splitter, a second light receiving device which receives the reflected light split into the ninth optical path by the non-deflection auxiliary beam splitter, and a light receiving area restricting means which is installed in the ninth optical path and restricts the light receiving area of the reflected light to be received by the second light receiving device; and the control means calculates the ratio of the quantity of light received by the first light receiving device to the quantity of light received by the second light receiving device of the first surface position detection means based on detection signals from the first light receiving device and the second light receiving device to obtain the height position of the top surface of the workpiece or the height position of the bottom surface of a via hole based on the ratio, calculates the ratio of the quantity of light received by the first light receiving device to the quantity of light received by the second light receiving device of the second surface position detection means based on detection signals from the first light receiving device and the second light receiving device to obtain the height position of the bottom surface of the via hole or the height position of the top surface of the workpiece based on the ratio, and obtains the depth of the via hole formed in the workpiece based on the height position of the top surface of the workpiece and the height position of the bottom surface of the via hole.

7. The via hole depth detector according to claim 6, wherein the control means comprises a memory having a storage area for storing a control map indicating the relationship between the ratio of the quantity of light received by the first light receiving device to the quantity of light received by the second light receiving device of the first surface position detection means or the second surface position detection means and the height position of a portion illuminated by the P wave or S wave of the detection laser beam, calculates the ratio of the quantity of light received by the first light receiving device to the quantity of light received by the second light receiving device of the first surface position detection means based on detection signals from the first light receiving device and the second light receiving device to obtain the height position of the top surface of the workpiece or the height position of the bottom surface of the via hole by collating the ratio with the control map, calculates the ratio of the quantity of light received by the first light receiving device to the quantity of light received by the second light receiving device of the second surface position detection means based on detection signals from the first light receiving device and the second light receiving device to obtain the height position of the bottom surface of the via hole or the height position of the top surface of the workpiece by collating the ratio with the control map, and obtains the depth of the via hole formed in the workpiece based on the height position of the top surface of the workpiece and the height position of the bottom surface of the via hole.

8. The via hole depth detector according to claim 6, wherein the memory of the control means has a storage area for storing data on the reflectances of a plurality of substances, and the control means judges whether the via hole formed in the workpiece reaches another substance from the processed substance based on the quantity of light received by the first light receiving device of the first surface position detection means or the second surface position detection means.

* * * * *